United States Patent
Bae et al.

(10) Patent No.: US 11,337,275 B2
(45) Date of Patent: May 17, 2022

(54) ELECTRONIC DEVICE SUPPORTING DUAL-CONNECTIVITY AND METHOD FOR OPERATING THE SAME

(71) Applicant: SAMSUNG ELECTRONICS CO., LTD., Suwon-si (KR)

(72) Inventors: Yungyu Bae, Suwon-si (KR); Jiyoung Cha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/030,660

(22) Filed: Sep. 24, 2020

(65) Prior Publication Data

US 2021/0144807 A1    May 13, 2021

(30) Foreign Application Priority Data

Nov. 8, 2019 (KR) .................. 10-2019-0142990

(51) Int. Cl.
*H04W 88/06* (2009.01)
*H04W 48/16* (2009.01)
(Continued)

(52) U.S. Cl.
CPC ........... *H04W 88/06* (2013.01); *H04W 24/10* (2013.01); *H04W 36/0069* (2018.08);
(Continued)

(58) Field of Classification Search
CPC ... H04W 12/068; H04W 24/10; H04W 76/15; H04W 48/16; H04W 52/0251; H04W 4/12; H04W 52/244; H04L 41/0803
(Continued)

(56) References Cited

U.S. PATENT DOCUMENTS

| 7,069,186 B2* | 6/2006 | Jung ..................... G01J 3/0218 356/402 |
| 8,125,962 B2* | 2/2012 | Charpentier .......... H04L 1/0026 370/332 |

(Continued)

FOREIGN PATENT DOCUMENTS

| JP | 2018-510563 A | 4/2018 |
| KR | 10-2015-0086593 | 7/2015 |

(Continued)

OTHER PUBLICATIONS

M. Nixon, D. Chen, T. Blevins and A. K. Mok, "Meeting control performance over a wireless mesh network," 2008 IEEE International Conference on Automation Science and Engineering, Sep. 2008, pp. 540-547, doi: 10.1109/COASE.2008.4626447. (Year: 2008).*

(Continued)

*Primary Examiner* — William D Cumming
(74) *Attorney, Agent, or Firm* — Nixon & Vanderhye P.C.

(57) ABSTRACT

According to an embodiment, an electronic device comprises: at least one communication processor configured to support first network communication and second network communication, wherein the at least one communication processor is configured to: receive a measurement command of at least one parameter associated with the second network communication based on the first network communication, identify whether a network communication other than the first network communication and the second network communication is activated, and based on identifying that the other network communication is activated, skip measurement on the at least one parameter associated with the second network communication.

20 Claims, 27 Drawing Sheets

(51) Int. Cl.
  *H04W 24/10* (2009.01)
  *H04W 76/30* (2018.01)
  *H04W 76/15* (2018.01)
  *H04W 36/00* (2009.01)
  *H04M 7/00* (2006.01)

(52) U.S. Cl.
  CPC ....... *H04W 36/0088* (2013.01); *H04W 48/16* (2013.01); *H04W 76/15* (2018.02); *H04W 76/30* (2018.02); *H04M 7/006* (2013.01)

(58) Field of Classification Search
  USPC ..... 455/435, 411, 67.11, 425; 370/338, 332, 370/252, 328, 331; 379/7
  See application file for complete search history.

(56) References Cited

U.S. PATENT DOCUMENTS

| | | | | |
|---|---|---|---|---|
| 8,160,629 | B2* | 4/2012 | Mate | H04W 52/244 370/332 |
| 8,521,216 | B2* | 8/2013 | Morita | H04W 88/02 709/203 |
| 8,639,283 | B2* | 1/2014 | Morita | H04W 88/02 455/550.1 |
| 8,682,294 | B2* | 3/2014 | Morita | H04W 88/02 380/278 |
| 8,903,385 | B2* | 12/2014 | Morita | G08G 1/005 455/435.2 |
| 10,179,496 | B1* | 1/2019 | Vaughan | B60G 21/026 |
| 2004/0259545 | A1* | 12/2004 | Morita | H04W 4/024 455/411 |
| 2008/0043692 | A1* | 2/2008 | Morita | G08G 1/123 370/338 |
| 2008/0056198 | A1* | 3/2008 | Charpentier | H04W 24/10 370/332 |
| 2008/0062925 | A1* | 3/2008 | Mate | H04W 52/244 370/331 |
| 2008/0102796 | A1* | 5/2008 | Morita | H04W 4/42 455/411 |
| 2008/0103685 | A1* | 5/2008 | Morita | H04W 12/068 701/117 |
| 2009/0073946 | A1* | 3/2009 | Morita | G08G 1/005 370/338 |
| 2009/0170441 | A1* | 7/2009 | Eckert | H04W 24/10 455/67.11 |
| 2010/0008477 | A1* | 1/2010 | Vasquez | H04M 3/2272 379/7 |
| 2010/0182919 | A1* | 7/2010 | Lee | H04W 24/10 370/252 |
| 2010/0184426 | A1* | 7/2010 | Hedberg | H04W 24/10 455/425 |
| 2010/0302958 | A1* | 12/2010 | Wietfeldt | H04W 76/15 370/252 |
| 2011/0085497 | A1* | 4/2011 | Fang | H04W 52/50 370/328 |
| 2011/0103249 | A1* | 5/2011 | Kim | H04W 24/10 370/252 |
| 2016/0345231 | A1 | 11/2016 | Moon et al. | |
| 2017/0071021 | A1* | 3/2017 | Jin | H04W 76/27 |
| 2017/0374559 | A1 | 12/2017 | Sun et al. | |
| 2019/0016189 | A1* | 1/2019 | Vaughan | B60G 21/067 |
| 2019/0364492 | A1* | 11/2019 | Azizi | H04W 68/005 |
| 2020/0205062 | A1* | 6/2020 | Azizi | H04W 48/10 |
| 2020/0389823 | A1 | 12/2020 | Xu et al. | |
| 2021/0037405 | A1 | 2/2021 | Bae et al. | |
| 2021/0096105 | A1* | 4/2021 | Kloza | G01N 29/326 |
| 2021/0144807 | A1* | 5/2021 | Bae | H04W 36/0088 |
| 2021/0273596 | A1* | 9/2021 | Lahbil | H02P 29/027 |
| 2021/0382989 | A1* | 12/2021 | Wei | G06F 21/552 |

FOREIGN PATENT DOCUMENTS

| | | | | |
|---|---|---|---|---|
| KR | 10-2021-0015091 A | 2/2021 | | |
| WO | WO-2014064491 A | * 5/2014 | ......... | H04L 41/0803 |
| WO | 2018/182240 | 10/2018 | | |
| WO | WO-2020204552 A1 | * 10/2020 | ........ | H04W 52/0251 |

OTHER PUBLICATIONS

"IEEE Recommended Practice for Network Reference Model and Functional Description of IEEE 802(R) Access Network," in IEEE Std 802.1CF-2019 , vol. No. pp. 1-185, May 31, 2019, doi: 10.1109/IEEESTD.2019.8726453. (Year: 2019).*

International Search Report and Written Opinion dated Jan. 29, 2021 in corresponding International Application No. PCT/KR2020/014591.

'3GPP; TSG RAN; E-UTRA and NR; Multi-connectivity'; Stage 2 (Release 15), 3GPP TS 37.340 V15.7.0, Sep. 28, 2019, sections 4.1.3.1, 7.2.

Huawei et al., 'Discussion on s-Measure in NR-DC', R2-1904569, 3GPP TSG-RAN WG2 #105bis, Xian, China, Mar. 28, 2019, section 2.

Ericsson, 'Extended use cases for early measurement', R2-1912546, 3GPP TSG-RAN WG2 #107bis, Chongqing, China, Oct. 3, 2019, sections 1-2.2.

* cited by examiner

ELECTRONIC DEVICE SUPPORTING DUAL-CONNECTIVITY AND METHOD FOR OPERATING THE SAME

CROSS-REFERENCE TO RELATED APPLICATION

This application is based on and claims priority under 35 U.S.C. § 119 to Korean Patent Application No. 10-2019-0142990, filed on Nov. 8, 2019, in the Korean Intellectual Property Office, the disclosure of which is incorporated by reference herein in its entirety.

BACKGROUND

Field

Embodiments of the disclosure relate to an electronic device supporting dual-connectivity and a method for operating the electronic device.

Description of Related Art

As mobile communication technology evolves, multi-functional portable terminals are commonplace and, to meet increasing demand for radio traffic, vigorous efforts are underway to develop 5G communication systems. To achieve a higher data transmission rate, 5G communication systems are being implemented on ultra-high frequency bands as well as those used for 3G and long-term evolution (LTE).

To implement 5G communication, stand-alone (SA) and non-standalone (NSA) schemes are taken into consideration. Of the two, the NSA scheme may include an LTE NR-dual connectivity scheme that uses the new radio (NR) system along with the legacy LTE system. In the NSA scheme, user equipment (UE) may use not only eNBs of the LTE system but also gNBs of the NR system. Technology allowing UEs to use heterogeneous communication systems may be termed dual connectivity.

Dual connectivity has been proposed in 3GPP release-12 where the 3.5 GHz frequency band other than that for LTE system is used for small cells. For dual connectivity proposed in 3GPP release-12 in the 5G EN-DC scheme, it is under discussion to use LTE network communication as a master node and NR network communication as a secondary node.

The user equipment (UE) may receive a message (e.g., an RRC connection reconfiguration message) intending to report at least one parameter corresponding to a neighbor cell from the master node. The UE may measure at least one parameter of a signal from the base station of the neighbor cell and report it to the master node. The master node may determine to add a secondary cell group (SCG) for a specific base station and instruct the UE to add the secondary cell group. The UE may transmit or receive data to/from the network based on two network communications.

The UE may support other network communication, e.g., Wi-Fi communication, than LTE network communication and NR network communication. If Wi-Fi communication is activated, the UE may transmit or receive data with the base station via Wi-Fi communication. In this case, as data is transmitted and received via Wi-Fi communication, data may not be transmitted and received via NR network communication. Although data is not transmitted and received via NR network communication, as the operations for NR network communication are performed, the UE may unnecessarily waste resources (e.g., current and/or computation resources).

SUMMARY

Embodiments of the disclosure provide an electronic device and method for operating the same that may skip the operations for adding an SCG based on other network communication being activated.

According to an example embodiment, an electronic device comprises: at least one communication processor configured to support first network communication and second network communication, wherein the at least one communication processor is configured to receive a measurement command of at least one parameter associated with the second network communication based on the first network communication, identify whether a network communication other than the first network communication and the second network communication is activated, and based on identifying that the other network communication is activated, skip measurement on the at least one parameter associated with the second network communication.

According to an example embodiment, a method for operating an electronic device configured to support first network communication and second network communication may comprise: receiving a measurement command of at least one parameter associated with the second network communication based on the first network communication, identifying whether a network communication other than the first network communication and the second network communication is activated, and based on identifying that the other network communication is activated, skipping measurement on the at least one parameter associated with the second network communication.

According to an example embodiment, an electronic device may comprise: at least one communication processor configured to support first network communication and second network communication, wherein the at least one communication processor is configured to receive a measurement command of at least one parameter associated with the second network communication based on the first network communication, skip measurement on the at least one parameter associated with the second network communication, based on network communication other than the first network communication and the second network communication being activated, and measure the at least one parameter associated with the second network communication based on the other network communication being deactivated.

According to an example embodiment, there may be provided an electronic device and method for operating the same, which may skip the operations for adding an SCG based on other network communication being activated. Thus, it is possible to reduce resource waste (e.g., current consumption for measurement and/or computation for performing a procedure for adding an SCG) for adding an SCG.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
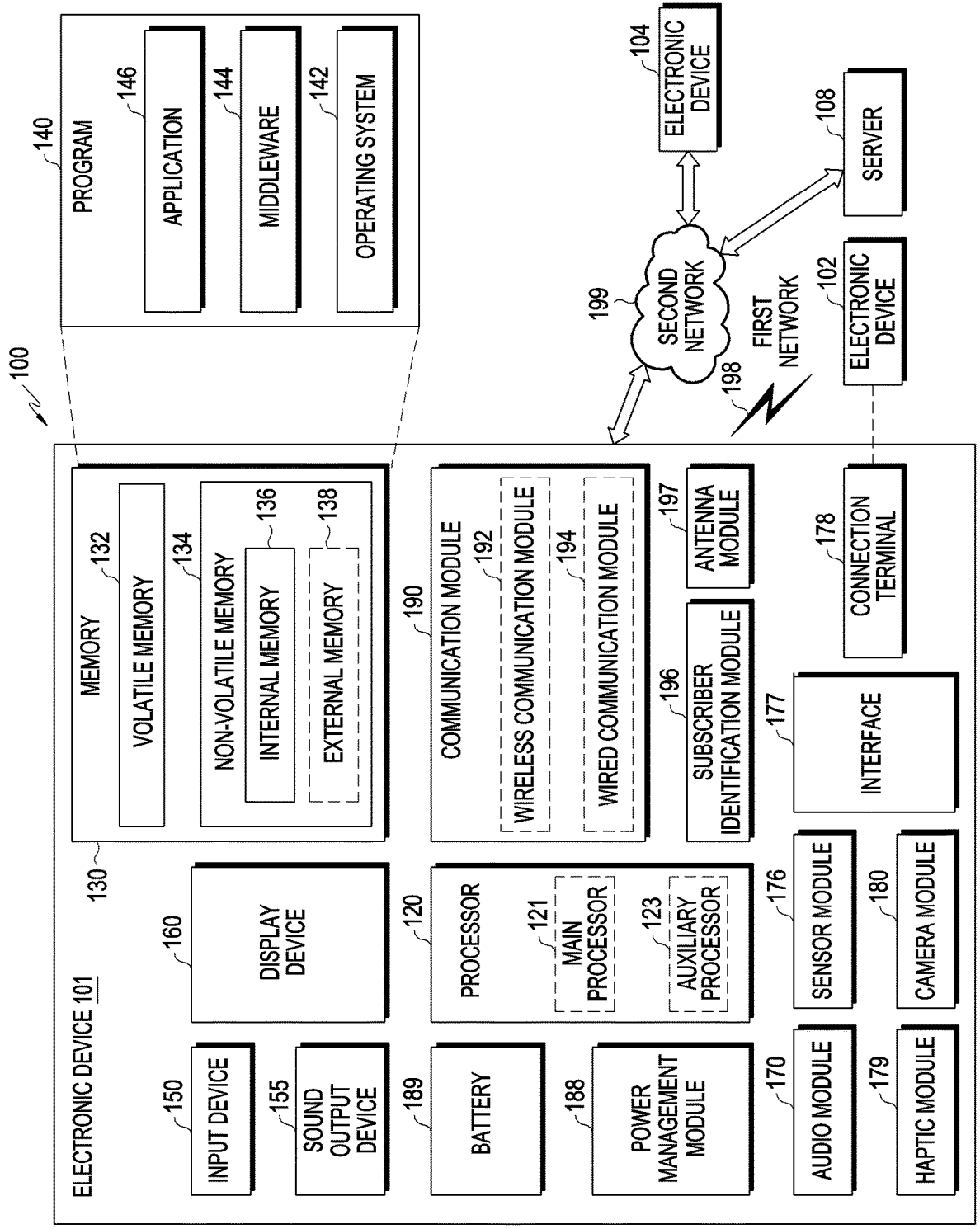
FIG. 1 is a block diagram illustrating an example electronic device in a network environment according to an embodiment.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
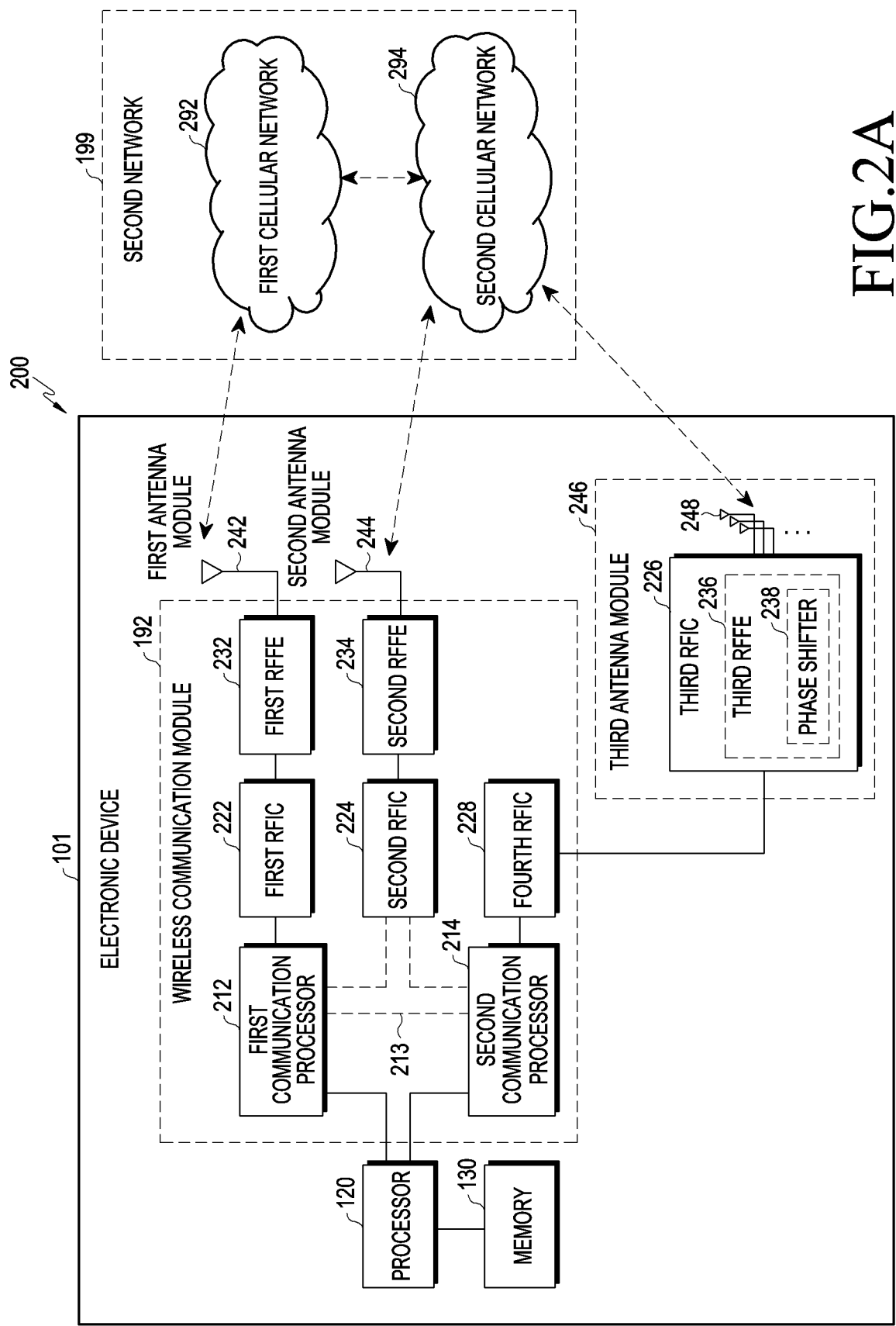
FIG. 2A is a block diagram illustrating an example electronic device supporting network communication and 5G network communication according to an embodiment.

FIG. 2A is a block diagram 200 illustrating an example electronic device 101 supporting network communication and 5G network communication according to an embodiment. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The network 199 may include a first network 292 and a second network 294. According to an embodiment, the electronic device 101 may further include at least one component among the components of FIG. 1, and the network 199 may further include at least one other network. According to an embodiment, the first communication processor (CP) 212, the second CP 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first CP 212 may establish a communication channel of a band that is to be used for wireless communication with the first network 292 or may support legacy network communication via the established communication channel. According to an embodiment, the first network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second network 294 or may support fifth generation (5G) network communication via the established communication channel. According to an embodiment, the second network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214.

For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an US-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
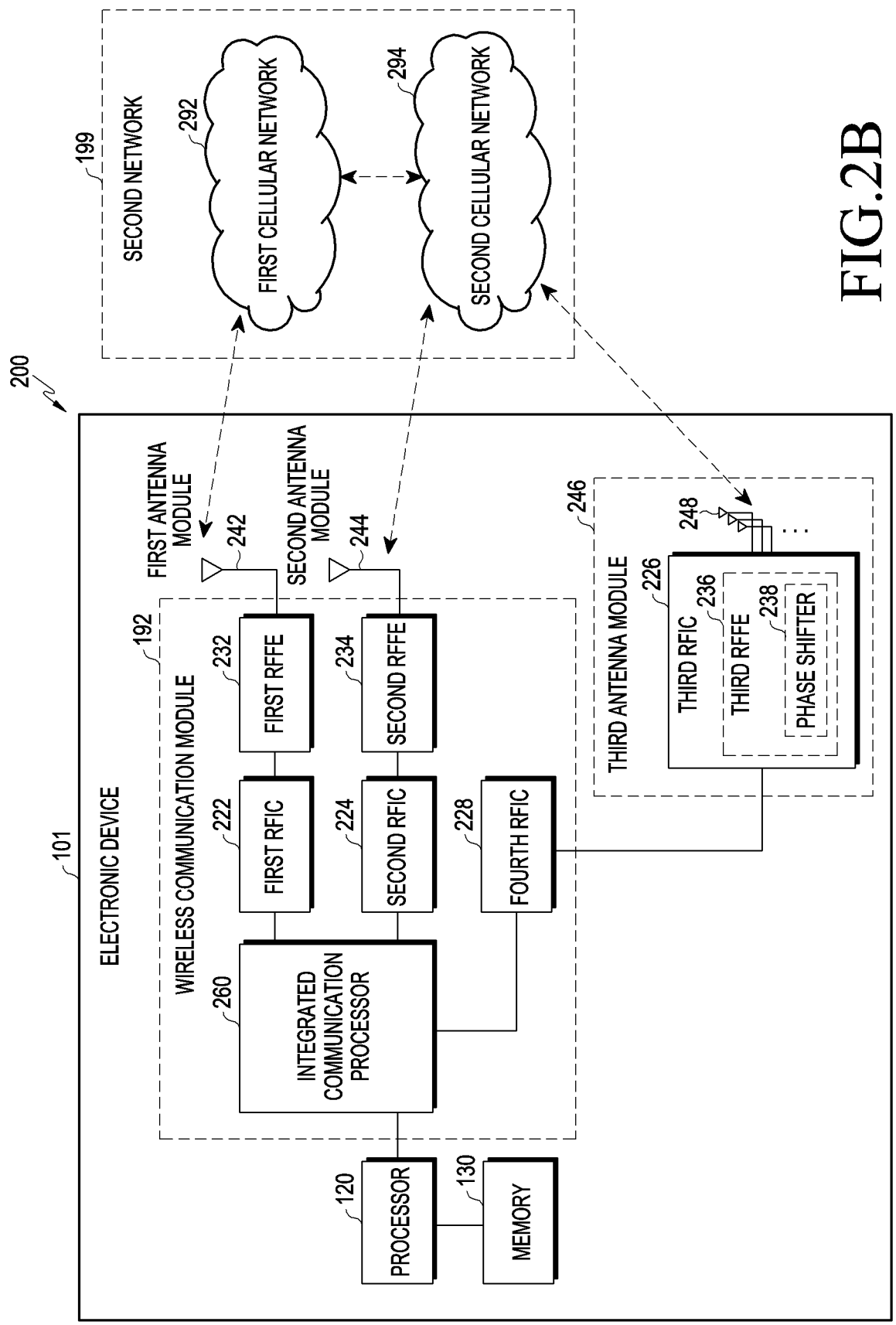
FIG. 2B is a block diagram illustrating an example electronic device supporting network communication and 5G network communication according to an embodiment.

According to an embodiment, the first CP 212 and the second CP 214 may be implemented in a single chip or a single package. According to an embodiment, the first CP 212 or the second CP 214, along with the processor 120, an assistance processor 123, or communication module 190, may be formed in a single chip or single package. For example, as shown in FIG. 2B, an integrated communication processor 260 may support all of the functions for communication with the first cellular network and the second cellular network.

Upon transmission, the first RFIC 222 may convert a baseband signal generated by the first CP 212 into a radio frequency (RF) signal with a frequency ranging from about 700 MHz to about 3 GHz which is used by the first network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first CP 212.

Upon transmission, the second RFIC 224 may convert the baseband signal generated by the first CP 212 or the second CP 214 into a Sub6-band (e.g., about 6 GHz or less) RF signal (hereinafter, "5G Sub6 RF signal") that is used by the second network 294 (e.g., a 5G network). Upon receipt, the 5G Sub6 RF signal may be obtained from the second network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first CP 212 and the second CP 214.

The third RFIC 226 may convert the baseband signal generated by the second CP 214 into a 5G Above6 band (e.g., from about 6 GHz to about 60 GHz) RF signal (hereinafter, "5G Above6 RF signal") that is to be used by the second network 294 (e.g., a 5G network). Upon receipt, the 5G Above6 RF signal may be obtained from the second network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second CP 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second CP 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second network 294 (e.g., a 5G network) through an antenna (e.g., the antenna 248) and be converted into an IF signal by the third RFIC 226. The fourth RFIC 228 may convert the IF signal into a baseband signal that may be processed by the second CP 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second network 294 (e.g., a 5G network) may be operated independently (e.g., as standalone (SA)) from, or in connection (e.g., as non-standalone (NSA)) with the first network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first CP 212, or the second CP 214).

Figure 3:
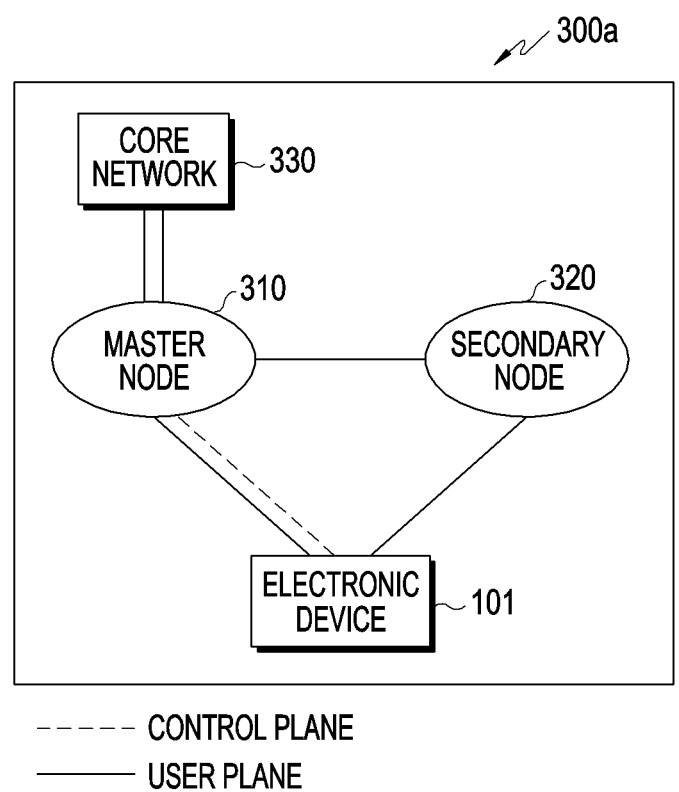
FIG. 3 is a diagram illustrating wireless communication systems providing a legacy communication network and/or a 5G communication network according to an embodiment.

FIG. 3 is a diagram illustrating example wireless communication systems providing a legacy communication network and/or a 5G communication network according to an embodiment. Referring to FIG. 3, the network environment 300*a* may include at least one of a legacy network and a 5G network. The legacy network may include, e.g., a 3GPP-standard 4G or LTE, base station (e.g., an eNodeB (eNB)) that supports radio access with the electronic device 101 and an evolved packet core (EPC) that manages 4G communication. The 5G network may include, e.g., a new radio (NR) base station (e.g., a gNodeB (gNB)) that supports radio access with the electronic device 101 and a 5th generation core (5GC) that manages 5G communication for the electronic device 101.

According to an embodiment, the electronic device 101 may transmit and/or receive control messages and user data via legacy communication and/or 5G communication. The control messages may include, e.g., messages related to at least one of security control, bearer setup, authentication, registration, or mobility management for the electronic device 101. The user data may refer, for example, to user data except for control messages transmitted or received between the electronic device 101 and the core network 330 (e.g., the EPC).

Referring to FIG. 3, according to an embodiment, the electronic device 101 may transmit or receive at least one of a control message or user data to/from at least part (e.g., the NR base station or 5GC) of the 5G network via at least part (e.g., the LTE base station or EPC) of the legacy network.

According to an embodiment, the network environment 300*a* may include a network environment that provides wireless communication dual connectivity (DC) to the LTE base station and the NR base station and transmits or receives control messages to/from the electronic device 101 via one core network 330 of the EPC or the 5GC.

According to an embodiment, in the DC environment, one of the LTE base station or the NR base station may operate as a master node (MN) 310, and the other as a secondary node (SN) 320. The MN 310 may be connected with the core network 330 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station, the SN may include the NR base station, and the core network 330 may include the EPC. For example, control messages may be transmitted/received via the LTE base station and the EPC, and user data may be transmitted/received at least one of the LTE base station or the NR base station.

According to an embodiment, the MN 310 may include the NR base station, the SN 320 may include the LTE base station, and the core network 330 may include the 5GC. For example, control messages may be transmitted/received via the NR base station and the 5GC, and user data may be transmitted/received at least one of the LTE base station or the NR base station.

According to an embodiment, the electronic device 101 may be registered in at least one of the EPC or the 5GC to transmit or receive control messages.

According to an embodiment, the EPC or the 5GC may interwork with each other to manage communication for the electronic device 101. For example, mobility information for the electronic device 101 may be transmitted or received via the interface between the EPC and the 5GC.

As set forth above, dual connectivity via the LTE base station and the NR base station may be referred to as E-UTRA new radio dual connectivity (EN-DC). Besides the EN-DC, the MR DC may have other various applications. For example, a first network and a second network by the MR DC may be both related to LTE communication, and the second network may be a network corresponding to a small cell of a specific frequency. For example, the first network and the second network by the MR DC may be both related to 5G, and the first network may correspond to a frequency band (e.g., below 6) less than 6 GHz, and the second network may correspond to a frequency band (e.g., over 6) not less than 6 GHz. It will be appreciated by one of ordinary skill in the art that other various dual-connectivity-applicable network structures may be applied to embodiments of the disclosure.

Figure 4:
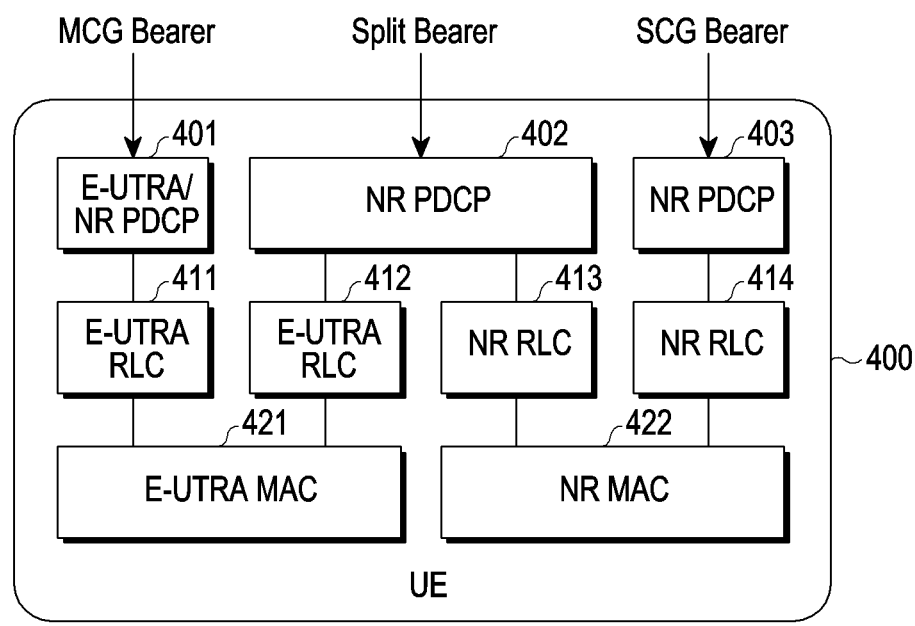
FIG. 4 is a block diagram illustrating an example bearer in a UE according to an embodiment.

FIG. 4 is a diagram illustrating an example bearer in a UE according to an embodiment.

Bearers possible in the 5G non-standalone network environment (e.g., the network environment 300a of FIG. 3) may include a master cell group (MCG) bearer, a secondary cell group (SCG) bearer, and a split bearer. An E-UTRA/NR (packet data convergence protocol) PDCP entity 401 and NR PDCP entities 402 and 430 may be configured in a user equipment (UE) 400. E-UTRA radio link control (RLC) entities 411 and 412 and NR RLC entities 413 and 414 may be configured in the UE 400. An E-UTRA MAC entity 421 and an NR MAC entity 422 may be configured in the UE 400. The UE may be a user device capable of communicating with base stations, and the UE may be interchangeably used with the electronic device 101 of FIG. 1. For example, when the UE performs a specific operation according to an embodiment, this may refer, for example, to at least one component of the electronic device 101 performing the specific operation.

The MCG may correspond to, e.g., the main node (MN) 310 of FIG. 3, and the SCG may correspond to the secondary node (SN) 320 of FIG. 3. The UE 400, if a node for communication is determined, may configure various entities as shown in FIG. 4 for communication with the determined node (e.g., a base station). The PDCP layer entities 401, 402, and 403 may receive data (e.g., PDCP SDU corresponding to IP packet) and output converted data (e.g., PDCP protocol data unit (PDU)) to which additional information (e.g., header information) has been applied. RLC layer entities 411, 412, 413, and 414 may receive the converted data (e.g., PDCP PDU) from the PDCP layer entities 401, 402, and 403 and output converted data (e.g., RLC PDU) to which additional information (e.g., header information) has been applied. MAC layer entities 421 and 422 may receive the converted data (e.g., RLC PDU) from the RLC layer entities 411, 412, 413, and 414 and output converted data (e.g., MAC PDU) to which additional information (e.g., header information) has been applied and transfer to the physical layer (not shown).

The MCG bearer may be associated with a path (or data) through which data may be transmitted/received only using the entity or resources corresponding to the MN in dual connectivity (DC). The SCG bearer may be associated with a path (or data) through which data may be transmitted/received only using the entity or resources corresponding to the SN in dual connectivity. The split bearer may be associated with a path (or data) through which data may be transmitted/received using the entity or resources corresponding to the MN and the entity or resources corresponding to the SN in dual connectivity. Thus, as shown in FIG. 4, the split bearer may be associated with all of the E-UTRA RLC entity 412 and the NR RLC entity 413 and the E-UTRA MAC entity 421 and NR MAC entity 422 via the NR PDCD entity 402.

Figure 5A:
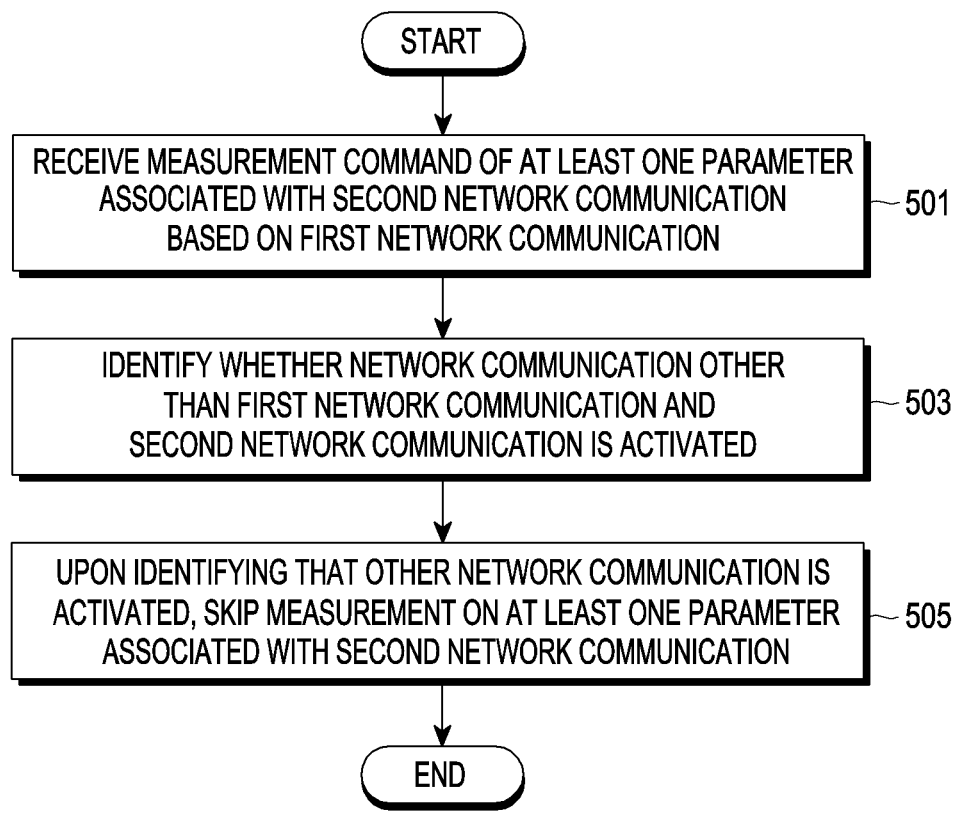
FIG. 5A is a flowchart illustrating an example operation of an electronic device according to an embodiment.

FIG. 5A is a flowchart illustrating example operations of an electronic device according to an embodiment.

According to an embodiment, an electronic device 101 (e.g., at least one of the processor 120, the first communication processor 212, the second communication processor 214, or the integrated communication processor 260) may receive a measurement command of at least one parameter associated with second network communication based on first network communication in operation 501. For example, the electronic device 101 may form an RRC connection with a first base station (e.g., an LTE base station (or eNB)) based on LTE network communication. The electronic device 101 may receive an RRC connection reconfiguration message from a first base station, and a reporting condition by an NR-B1 event may be included in the RRC connection reconfiguration message. The first base station may transfer a message including a measurement object to the electronic device 101, based on the capability received from the electronic device 101. The electronic device 101 may configure a reporting condition by the NR-B1 event based on the RRC connection reconfiguration message. The reporting condition may be to report, to the LTE base station, which is the master node, the measured parameter when a parameter (e.g., at least one of the reference signal received power (RSRP), reference signal received quality (RSRQ), received signal strength indicator (RSSI), or signal-to-noise ratio (SNR)) for the signal from the neighbor cell of the second network communication (e.g., NR network communication) exceeds a threshold.

According to an embodiment, the electronic device 101 may identify whether network communication other than the first network communication and the second network communication is activated in operation 503. For example, the electronic device 101 may identify whether Wi-Fi communication, which is network communication capable of data transmission/reception, is activated. The electronic device 101 may form a Wi-Fi connection with a Wi-Fi access point (AP), and the detailed procedure of Wi-Fi connection is not directly related to the disclosure and, thus, no description thereof is given below. When Wi-Fi connection with the Wi-Fi AP is formed, and the state of being capable of data transmission/reception is identified, the electronic device 101 may identify that the Wi-Fi communication is activated. A configuration in which various entities (e.g., the processor 120 or the communication processor (e.g., 212, 214, and/or 260) of the electronic device 101 identify whether Wi-Fi communication is activated is described below. Wi-Fi communication may denote at least some of control modules following the IEEE 802.11 b/a/g/i/n/p/y/ac/ad/ah/af/ax/ay/be standards. The other network in operation 503 may replace Wi-Fi communication as long as it is able to transmit/receive user data, and it will be appreciated by one of ordinary skill in the art that the instant embodiment is applicable to Wi-Fi communication adopted after the filing of the instant application.

According to an embodiment, upon identifying that the other network communication is activated, the electronic device 101 may skip measurement on at least one parameter associated with the second network communication in operation 505. Although receiving an RRC connection reconfiguration message including the reporting condition (e.g., NR-B1 event) in operation 501, the electronic device 101 may skip measurement if the other network communication is identified as activated. As measurement on at least one parameter associated with the second network communication (e.g., NR network communication) of the electronic device 101 is skipped, at least one parameter may not be reported. Thus, the base station of the first network communication may refrain from adding an SCG, and the electronic device 101 may omit an unnecessary SCG add procedure. As the SCG add procedure is omitted, the second network communication (e.g., NR network communication) may not be connected, but the electronic device 101 may transmit or receive user data via the other network communication (e.g., Wi-Fi communication). The above-described example in which LTE network communication corresponds to the MCG, and NR network communication corresponds to the SCG is merely an example, and it will be appreciated by one of ordinary skill in the art that the disclosure may also apply where NR network communication corresponds to the MCG, and LTE network communication corresponds to the SCG and may be applicable to any dual connectivity.

According to an embodiment, as described above, the electronic device 101 may skip measurement on at least one parameter associated with second network communication. The electronic device 101 may skip only measurement while maintaining capability, for example. Or, the electronic device 101 may switch the capability capable of supporting both the first network communication and the second network communication to the capability supporting the first network communication alone. According to an embodiment, the electronic device 101 may report the switched capability to the first network 702 in which case no measurement object may be received from the first network 702.

According to an embodiment, as the measurement is skipped, the current consumed by the measurement may be reduced. Further, the waste of resources (e.g., computation load of processor, and current consumption for communication signal transmission/reception and processing) consumed by adding an SCG after measurement may be decreased.

Figure 5B:
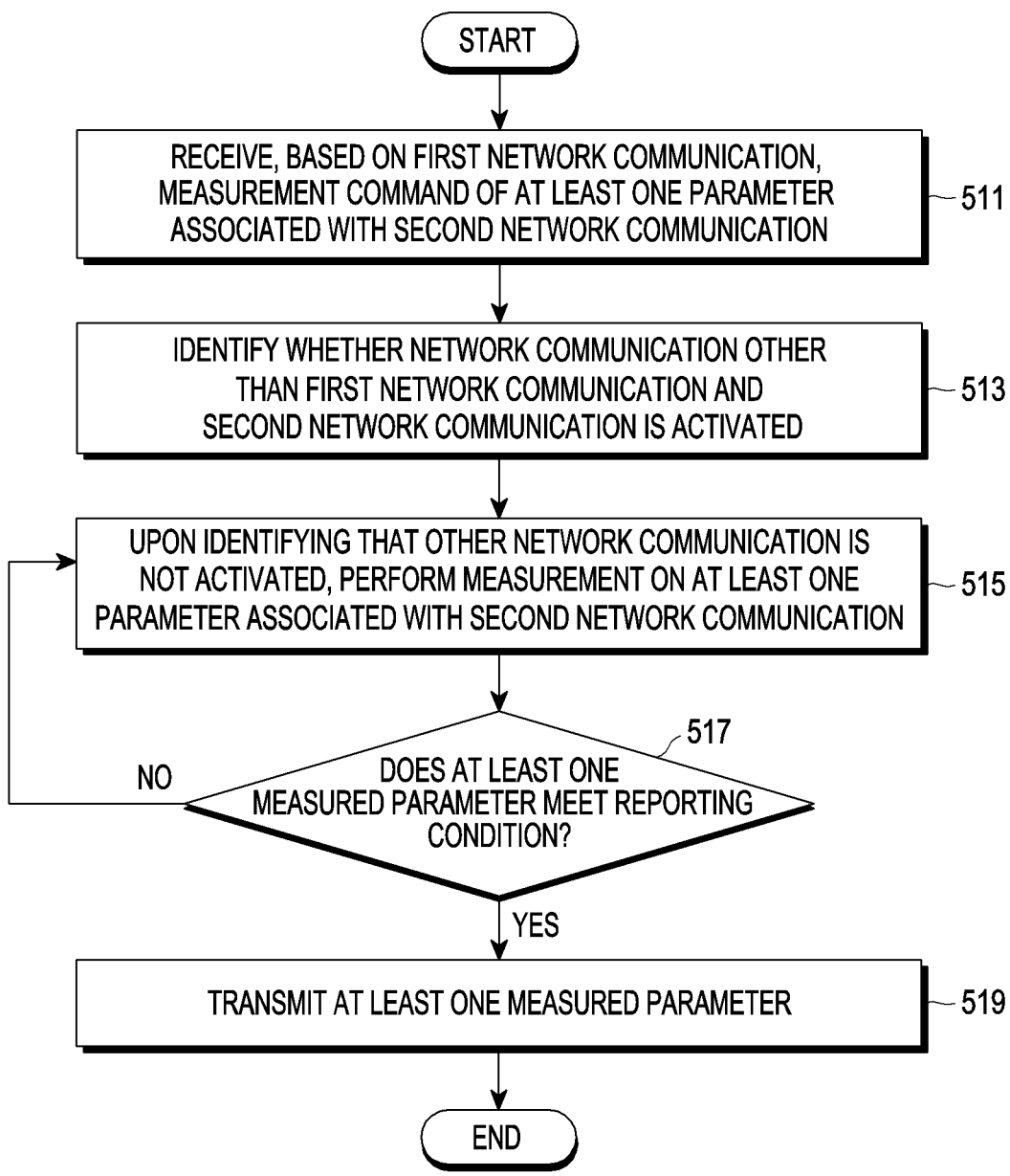
FIG. 5B is a flowchart illustrating an example operation of an electronic device according to an embodiment.

FIG. 5B is a flowchart illustrating an example operation of an electronic device according to an embodiment. Among the operations of FIG. 5B, those already described above are briefly described below.

According to an embodiment, an electronic device 101 (e.g., at least one of the processor 120, the first communication processor 212, the second communication processor 214, or the integrated communication processor 260) may receive a measurement command of at least one parameter associated with second network communication based on first network communication in operation 511. It may be identified whether other network communication than the first network communication and the second network communication is activated in operation 513.

According to an embodiment, upon identifying that other network communication is not activated, the electronic device 101 may perform measurement on at least one parameter associated with the second network communication in operation 515. The electronic device 101 may identify the reporting condition in the RRC connection reconfiguration message received from the first base station which is the master node corresponding to the first network communication. The reporting condition may include, e.g., an NR-B1 event. Thus, the electronic device 101 may measure the parameter (e.g., RSRP and/or RSRQ) of the communication signal from the neighbor cell. In operation 517, the electronic device 101 may identify whether at least one parameter measured meets the reporting condition. Unless the reporting condition is identified to be met (no in 517), the electronic device 101 may continuously perform measurement on at least one parameter associated with the second network communication. When the reporting condition is identified to be met (yes in 517), the electronic device 101 may transmit at least one measured parameter in operation 519. The entering condition and leaving condition according to the NR-B1 event which is an example of the reporting condition may be as illustrated in Table 1 below.

TABLE 1

Inequality B1-1 (Entering condition)
Mn + Ofn − Hys > Thresh
Inequality B1-2 (Leaving condition)
Mn + Ofn + Hys < Thresh
Hys: reflect the hysteresis value
Ofn: freq. reflect a specific offset In Table 1, Mn may denote the result of measurement on the inter-RAT neighbor cell, and no offset may have been applied to this value. According to various embodiments of the disclosure, measurement on the neighbor cell may refer, for example, to measuring the characteristics of the signal transmitted from the neighbor cell. Mn may be expressed in dBm or dB, relying on the measurement quantity of the inter-RAT neighbor cell. Ofn may be the frequency-specific offset of the inter-RAT neighbor cell. Hys may be the hysteresis parameter for B1 event. Thresh may be the threshold parameter for B1 event. Ofn and Hys may be expressed in dB or dBm, and Hys may be represented in the same unit as Mn. For example, when Mn+Ofn−Hys exceeds Thresh, the electronic device 101 may transmit the result of measurement on the cell to the MN (e.g., the first base station) and may perform at least one additional operation for MR DC. Further, when Mn+Ofn+Hys is less than Thresh, the electronic device 101 may stop transmission of the result of measurement on the cell. According to an embodiment, upon receiving the report, the master node may add an SCG and transmit an RRC connection reconfiguration message for SCG adding to the electronic device 101. The electronic device 101 may perform an RACH with the base station corresponding to the second network communication based on the received RRC connection reconfiguration message.

According to an embodiment, unless Wi-Fi communication is activated, the electronic device 101 may form normal dual connectivity.

Figure 6A:
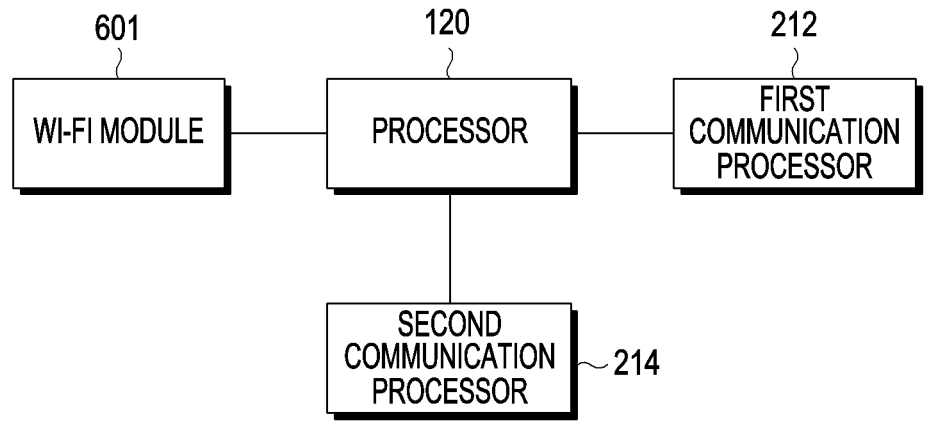
FIGS. 6A, 6B, and 6C are block diagrams illustrating an example electronic device according to an embodiment.
Figure 6B:
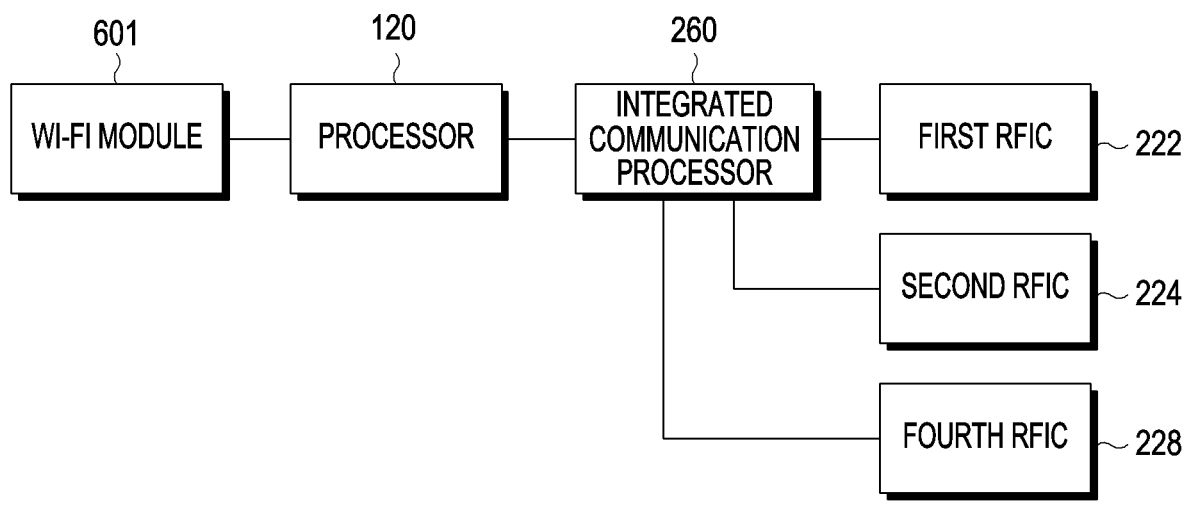
Figure 6C:
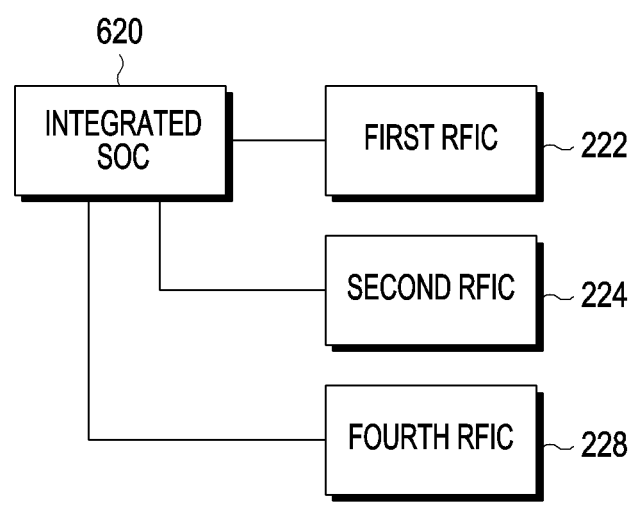

FIGS. 6A, 6B, and 6C are block diagrams illustrating an example electronic device according to an embodiment.

According to an embodiment, as shown in FIG. 6A, the electronic device 101 may include at least one of a processor (e.g., including processing circuitry) 120, a first communication processor (e.g., including processing circuitry) 212, a second communication processor (e.g., including processing circuitry) 214, and/or a Wi-Fi module (e.g., including Wi-Fi circuitry) 601. Although in FIGS. 1 and/or 2A, at least some of the components of the electronic device 101 may be included in the electronic device 101, it will be appreciated by one of ordinary skill in the art that they have been omitted for ease of description. The Wi-Fi module 601 may include various Wi-Fi circuitry and form a Wi-Fi connection with an external Wi-Fi AP and transmit/receive data via the Wi-Fi connection. As described above, the Wi-Fi module 601 may support at least some of the legacy Wi-Fi specifications, and the Wi-Fi module 601 may be replaced with a module supporting any communication, which may transmit or receive data. Since there is no restriction to the module as long as it supports any communication capable of data transmission/reception, it will be appreciated by one of ordinary skill in the art that the Wi-Fi module 601 may be implemented as a module supporting Wi-Fi standards proposed below in the disclosure.

According to an embodiment, in the state in which the Wi-Fi module 601 forms a Wi-Fi connection and is capable of data transmission/reception, the Wi-Fi module 601 may provide information indicating that Wi-Fi communication has been activated to the processor 120. The processor 120 may transfer the data to be transmitted to the Wi-Fi module 601 and/or receive data via the Wi-Fi module 601. For example, the processor 120 may control the display device 160 (refer to FIG. 1) to display an icon, which indicates that Wi-Fi communication has been activated, on the status bar.

According to an embodiment, the processor 120 may include various processing circuitry and obtain information indicating that Wi-Fi connection has been activated. For example, the processor 120 may receive information indicating that Wi-Fi connection has been activated from an external Wi-Fi module or may identify the information indicating that Wi-Fi connection has been activated in the Wi-Fi module embedded in the processor 120. The processor 120 may provide information indicating that the Wi-Fi connection has been activated to the first communication processor 212 and/or the second communication processor 214. The information indicating that the Wi-Fi communication has been activated may be expressed as, e.g., a flag (1 or 0), but is not limited to a specific expression format. When the processor 120 provides the information indicating that the Wi-Fi communication has been activated to the first communication processor 212, the first communication processor 212 may control the second communication processor 214 to skip measurement corresponding to the second network communication (e.g., communication corresponding to the SCG). The first communication processor 212 may forward the information indicating the Wi-Fi communication has been activated to the second communication processor 214. In this case, the second communication processor 214 may skip measurement on the second network communication based on the information indicating that the Wi-Fi communication has been activated, or control information from the first communication processor 212. According to an embodiment, when any one communication processor controls another communication processor, this may refer, for example, to the communication processor transmitting control information for control to the other communication processor, but it will be appreciated by one of ordinary skill in the art that it may be replaced with forwarding information received by the communication processor to the other communication processor.

For example, the first communication processor 212 may receive an RRC connection reconfiguration message including the measurement object from the first base station corresponding to the MCG and may identify the measurement object for the second network communication. If Wi-Fi communication is activated despite identifying the measurement object, the first communication processor 212 may refrain from transferring the measurement object to the second communication processor 214. If the Wi-Fi communication is activated although having transferred the measurement object to the second communication processor 214, the first communication processor 212 may provide a command to skip measurement to the second communication processor 214. The first communication processor 212 may forward the information indicating the Wi-Fi communication has been activated to the second communication processor 214. According to another embodiment, in the case where the processor 120 provides the information indicating that the Wi-Fi communication has been activated to the second communication processor 214, the second communication processor 214 may skip measurement corresponding to the second network communication. For example, the second communication processor 214 may receive the measurement object via the first communication processor 212. Upon receiving the information indicating that the Wi-Fi communication has been activated although the measurement object has been received, the second communication processor 214 may skip measurement corresponding to the second network communication.

The above-described case where the first network communication is communication corresponding to the MCG is merely an example, and the second network communication may be set as communication corresponding to the MCG. In this case, when the processor 120 provides the information indicating that the Wi-Fi communication has been activated to the second communication processor 214, the second communication processor 214 may control the first communication processor 212 to skip measurement corresponding to the first network communication (e.g., communication corresponding to the SCG). The second communication processor 214 may forward the information indicating the Wi-Fi communication has been activated to the first communication processor 212. In the case where the processor 120 provides the information indicating that the Wi-Fi communication has been activated to the first communication processor 212, the first communication processor 212 may skip measurement corresponding to the first network communication.

According to an embodiment, the Wi-Fi module 601 may be implemented in a single piece of hardware (e.g., a single chip) with the processor 120 in which case the integrated chip may provide the information indicating that the Wi-Fi communication has been activated to the first communication processor 212 and/or the second communication processor 214.

Referring to FIG. 6B, according to an embodiment, the electronic device 101 may include at least one of a processor (e.g., including processing circuitry) 120, an integrated communication processor (e.g., including processing circuitry) 260, a first RFIC 222, a second RFIC 224, a fourth RFIC 228, and/or a Wi-Fi module (e.g., including Wi-Fi circuitry) 601. Although in FIGS. 1 and/or 2B, at least some of the components of the electronic device 101 may be included in the electronic device 101, it will be appreciated by one of ordinary skill in the art that they have been omitted for ease of description. The integrated communication processor 260 may receive the information indicating that the Wi-Fi communication has been activated from the processor 120. The integrated communication processor 260 may receive a measurement object for the second network communication from the first base station based on the first network communication. Although receiving the measurement object, the integrated communication processor 260 may skip measurement on the measurement object corresponding to the second network communication based on the Wi-Fi communication being activated. For example, the integrated communication processor 260 may not apply the current for measurement of the measurement object corresponding to the second network communication to the second RFIC 224 and/or the fourth RFIC 228. The integrated communication processor 260 may control the block corresponding to the second network in a deactivated state (e.g., a sleep state or idle state).

The above-described case where the first network communication is communication corresponding to the MCG is merely an example, and the second network communication may be set as communication corresponding to the MCG. In this case, in the case where the processor 120 provides the information indicating that the Wi-Fi communication has been activated to the integrated communication processor 260, the integrated communication processor 260 may not apply the current for measurement on the measurement object corresponding to the first network communication to the first RFIC 222 and/or the second RFIC 224. The integrated communication processor 260 may control the block corresponding to the first network in a deactivated state (e.g., a sleep state or idle state).

According to an implementation, the Wi-Fi module 601 may be implemented in a single piece of hardware (e.g., a single chip) with the processor 120 in which case the integrated chip may provide the information indicating that the Wi-Fi communication has been activated to the integrated communication processor 260.

Referring to FIG. 6C, according to an embodiment, the electronic device 101 may include at least one of an integrated system-on-chip (SoC) 620, a first RFIC 222, a second RFIC 224, or a fourth RFIC 228 as shown in FIG. 6C. Although in FIGS. 1 and/or 2B, at least some of the components of the electronic device 101 may be included in the electronic device 101, it will be appreciated by one of ordinary skill in the art that they have been omitted for ease of description. The integrated SoC 620 may support, e.g., the first network communication (e.g., LTE network communication), the second network communication (e.g., NR communication), and Wi-Fi communication and may perform the overall operation of the electronic device 101. For example, the integrated SoC 620 may be an integrated chip of an application processor and communication processor supporting the EN-DC and may additionally provide Wi-Fi communication.

According to an embodiment, the integrated SoC 620 may form a Wi-Fi connection with the Wi-Fi AP. The integrated SoC 620 may receive a measurement object for the second network communication from the first base station based on the first network communication. Although receiving the measurement object, the integrated communication processor 260 may skip measurement on the measurement object corresponding to the second network communication based on the Wi-Fi communication being activated. For example, the integrated SoC 620 may not apply the current for measurement of the measurement object corresponding to the second network communication to the second RFIC 224 and/or the fourth RFIC 228. The integrated SoC 620 may control the block corresponding to the second network in a deactivated state (e.g., a sleep state or idle state).

The above-described case where the first network communication is communication corresponding to the MCG is merely an example, and the second network communication may be set as communication corresponding to the MCG. In this case, the integrated SoC 620 may not apply the current for measurement of the measurement object corresponding to the first network communication to the first RFIC 222 and/or the second RFIC 224. The integrated SoC 620 may control the block corresponding to the first network in a deactivated state (e.g., a sleep state or idle state).

According to an implementation, the integrated SoC 620 may not support the Wi-Fi function in which case an additional Wi-Fi module (e.g., the Wi-Fi module 601) may be added to the electronic device 101. The integrated SoC 620 may receive the information indicating that the Wi-Fi communication has been activated, from the Wi-Fi module. The integrated SoC 620 may perform the operations of FIG. 5A and/or FIG. 5B.

Figure 7:
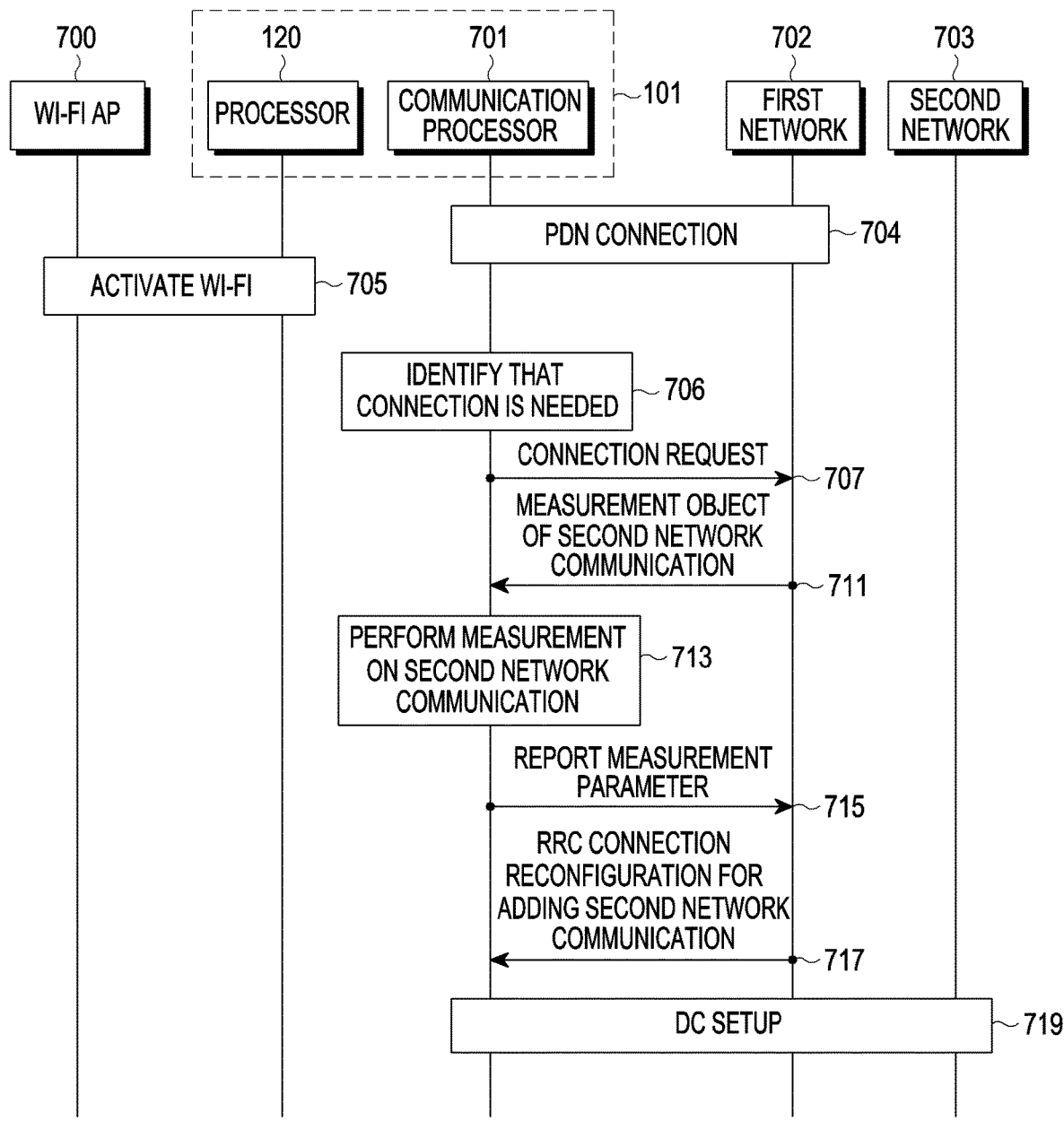
FIG. 7 is a signal flow diagram illustrating example operations of an electronic device, a Wi-Fi AP, and base stations according to a comparative example for comparison with an embodiment.

FIG. 7 is a signal flow diagram illustrating example operations of an electronic device 101, a Wi-Fi AP 700, and base stations included in networks 703, 703 according to a comparative example for comparison with an embodiment. It will be appreciated by one of ordinary skill in the art that at least some of the operations according to a comparative example may be performed according to various embodiments of the disclosure.

According to the comparative example, the communication processor 701 may perform packet data network (PDN) connection (or access) with the first network 702 in operation 704. The first network 702 may include an access network and/or core network supporting first network communication (e.g., LTE communication) and may include at least one of, e.g., a base station (e.g., eNB), cell, MN, or EPC, but it will be appreciated by one of ordinary skill in the art that any entity for supporting the first network communication may be included in the first network 702. The second network 703 may include an access network and/or core network supporting second network communication (e.g., NR communication) and may include at least one of, e.g., a base station (e.g., gNB), cell, SN, or 5GC, but it will be appreciated by one of ordinary skill in the art that any entity for supporting the second network communication may be included in the second network 703. The communication processor 701 may include various communication circuitry including at least one of, e.g., the first communication processor 212, the second communication processor 214, or the integrated communication processor 260. Or, the processor 120 and the communication processor 701 may be replaced with an integrated SoC 620. Based on a PDN connection, an Internet packet data network (PDN) and Internet protocol multimedia subsystem (IMS) PDN may be formed. The communication processor 701 may be connected with the Internet via, e.g., a first PDN gateway (P-GW) and with an IMS via a second PDN gateway, and the networks may be named an Internet PDN and an IMS PDN, respectively. According to an implementation, based on the Internet PDN, the electronic device 101 may transmit or receive user data and may perform voice over LTE (VoLTE) based on the IMS PDN. The above-described Internet PDN and IMS PDN are merely an example, and the kind of PDN formed by the electronic device 101 is not limited.

According to the comparative example, in operation 705, the processor 120 may form a Wi-Fi connection with the Wi-Fi AP 700, activating the Wi-Fi communication. The processor 120 may activate the Wi-Fi communication with the Wi-Fi AP 700 via the Wi-Fi module. The electronic device 101 may transmit or receive user data via the Wi-Fi communication. According to the comparative example or an embodiment, the communication processor 701 may identify that connection to the network of the electronic device 101 is needed in operation 706. As an example, the communication processor 701 may identify that connection to the network is required based on a request from the processor 120. For example, the processor 120 may provide a service request to the communication processor 701 according to a user input and/or a request of the application being executed. The service request may include at least one of, e.g., a VoLTE call request, a data service request, and an MMS message service request, but is not limited to a specific kind. The communication processor 701 may identify that connection is required based on reception of a service request from the processor 120. As another example, the communication processor 701 may identify that connection is required based on a request (e.g., a paging request) from the network (e.g., the first network 702). As another example, the communication processor 701 may identify that connection is required on its own. For example, the communication processor 701 may identify that connection is required based on a registration procedure (e.g., an attach procedure and/or a tracking area update (TAU) procedure).

According to the comparative example or an embodiment, the communication processor 701 may transfer a connection request to the first network 702 in operation 707. Upon identifying that connection is required by a VoLTE call request, the communication processor 701 may transfer the VoLTE call request to the first network 702. The connection request transmitted in operation 707 may be configured to differ depending on the factor that the communication processor 701 has identify that connection is required. In the case where the VoLTE call request is transmitted from the communication processor 701 to the first network 702, the first network 702 may set up a VoLTE call with the communication processor 701. It will be appreciated by one of ordinary skill in the art that the operation for the first network 702 to set up a VoLTE call with other entity than the electronic device 101 has been omitted for ease of description. Thereafter, the electronic device 101 may terminate the set-up VoLTE call. In operation 711, the first base station 701 may transmit a measurement object of the second network communication to the electronic device 101. For example, based on the termination of the VoLTE call, a data radio bearer (DRB) release including the measurement object of the second network communication may be transmitted. The DRB release may be transmitted before or while setting up the VoLTE call. The message including the measurement object of the second network communication is not limited and may be included in, e.g., an RRC connection reconfiguration message. In operation 713, the communication processor 701 may perform measurement on the second network communication based on the received measurement object. If the result of measurement meets the reporting condition, the communication processor 701 may report the measured parameter to the first network 702 in operation 715. The first network 702 may select a second network 703 for SCG adding, based on the reported parameter. The first network 702 may transmit an RRC connection reconfiguration message for second network communication adding to the electronic device 101 in operation 717. The electronic device 101 may form a connection with the base station (e.g., the second network 703) selected based on information in the received RRC connection reconfiguration message, thereby setting up dual connectivity (DC) in operation 719. Thus, as the second network communication is unnecessarily set up although the electronic device 101 is able to transmit or receive user data via the Wi-Fi AP 700, resources may be wasted.

Figure 8A:
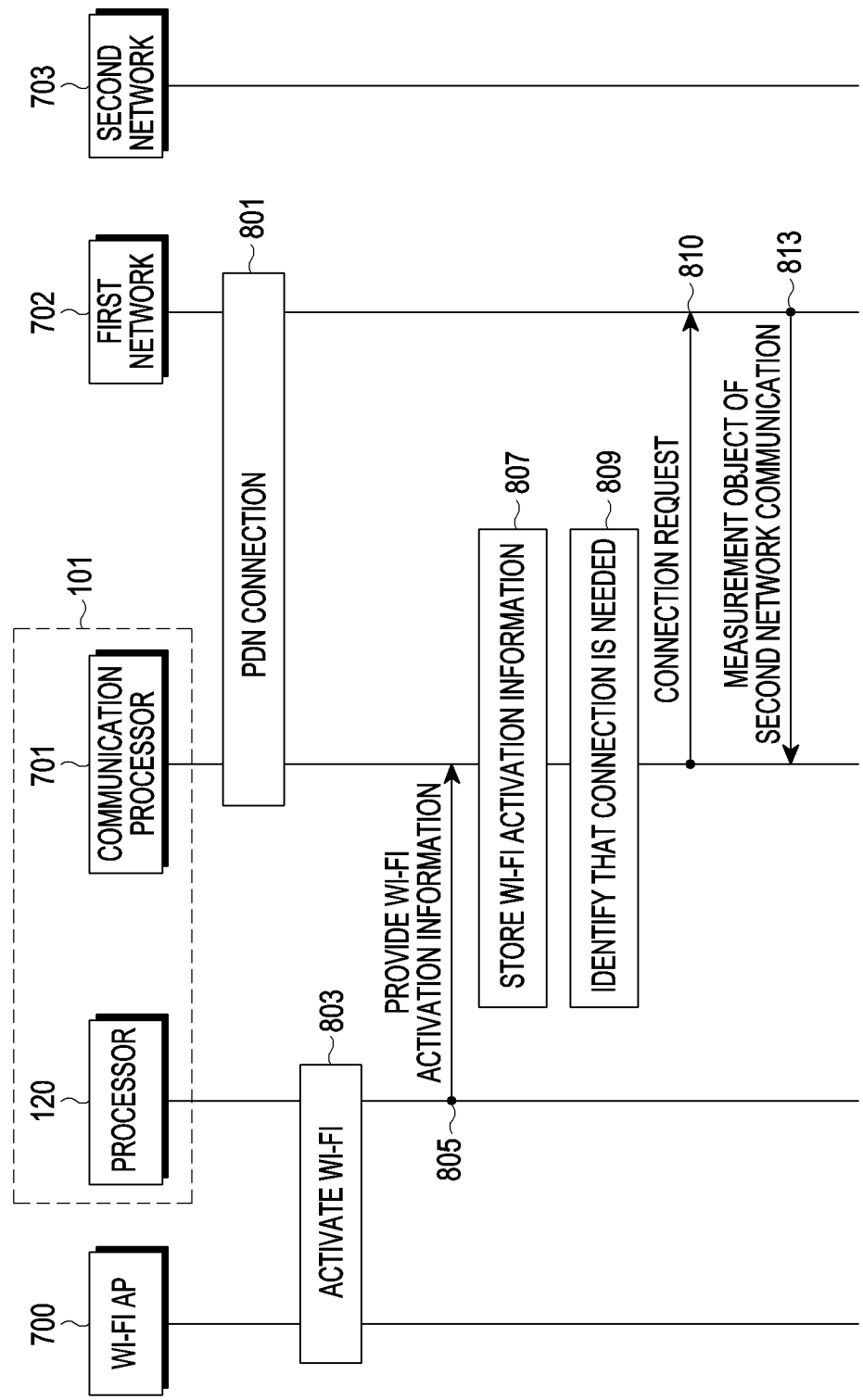
FIGS. 8A and 8B are signal flow diagrams illustrating example operations of an electronic device, a Wi-Fi AP, and base stations according to an embodiment.
Figure 8B:
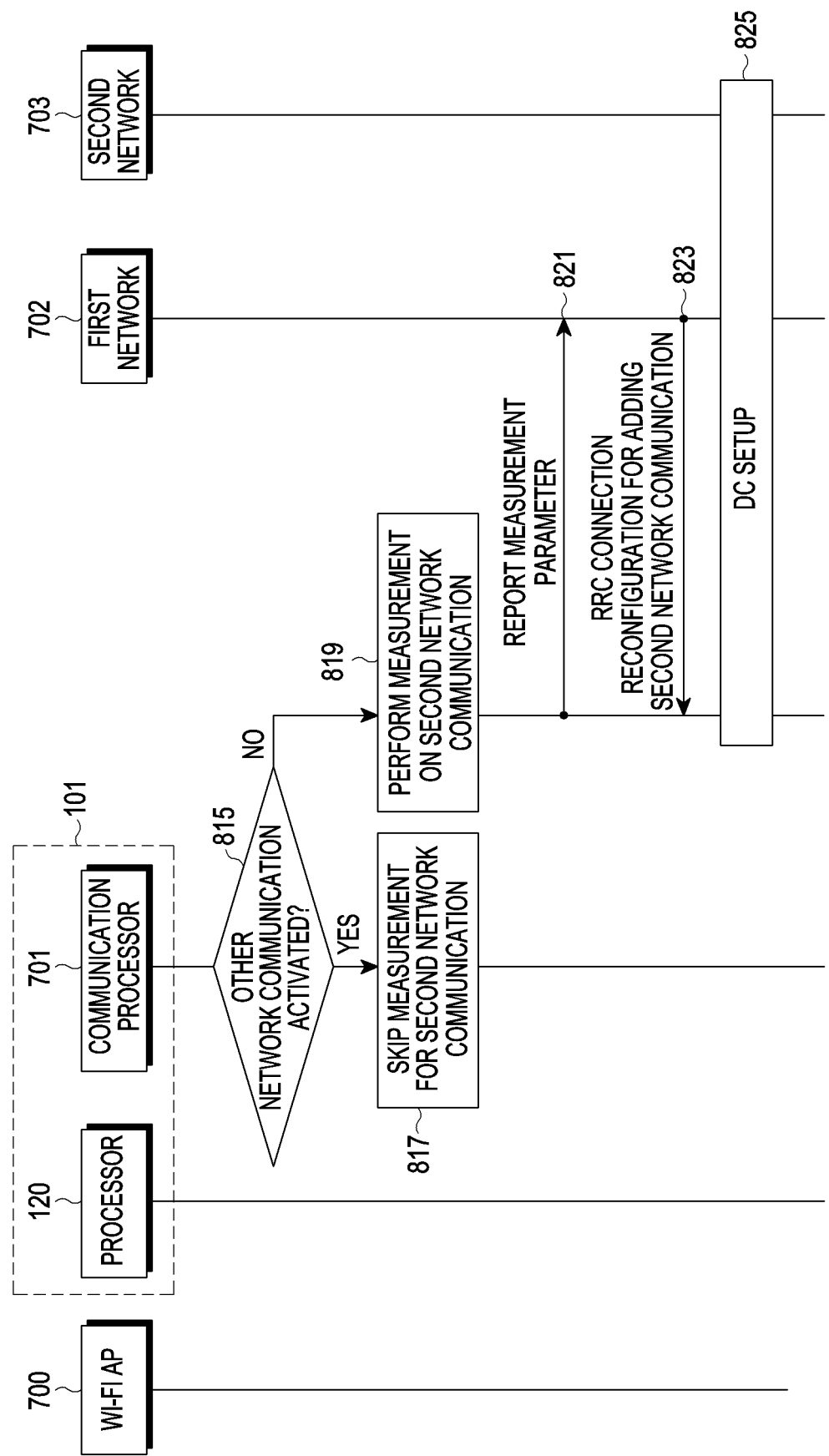

FIGS. 8A and 8B are signal flow diagrams illustrating example operations of an electronic device 101, a Wi-Fi AP 700, and base stations of first and second networks 702, 703 according to an embodiment. Among the operations of FIGS. 8A and 8B, those already described above are briefly described below.

According to an embodiment, the communication processor 701 (e.g., at least one of the first communication processor 212, the second communication processor 214, or the integrated communication processor 260) may form a PDN connection with the first network 702 in operation 801. Based on the PDN connection, an Internet PDN and an IMS PDN may be formed. In operation 803, the processor 120 may form a Wi-Fi connection with the Wi-Fi AP 700, thereby activating the Wi-Fi communication. The processor 120 may activate the Wi-Fi communication with the Wi-Fi AP 700 via the Wi-Fi module. According to an embodiment, the Wi-Fi module may be included in the AP 700. The electronic device 101 may transmit and/or receive user data via the Wi-Fi communication. The processor 120 may provide Wi-Fi activation information to the communication processor 701 in operation 805. The communication processor 701 may store the Wi-Fi activation information in operation 807. For example, the communication processor 701 may store the Wi-Fi activation information in the memory inside the communication processor 701 or in a memory outside the communication processor 701, which is accessible by the communication processor 701. In operation 809, the communication processor 701 may identify that connection to the network is needed. As described above in connection with FIG. 7, according to an embodiment, the communication processor 701 may identify that connection is required, based on at least one of a request from the processor 120, such as a VoLTE call request, a request from the network, such as of paging, or an event that the communication processor 701 has identified on its own, such as a TAU. For example, the processor 120 may transfer a VoLTE call request to the communication processor 701 in operation 805. For example, the processor 120 may execute a call application and obtain a call request for any phone number. The processor 120 may transfer a VoLTE call request for the phone number to the communication processor 701, and the communication processor 701 may identify that connection is required.

According to an embodiment, the communication processor 701 may transfer the connection request to the first network 702 in operation 810. Thereafter, in operation 813, the first network 702 may transmit a measurement object of the second network communication to the electronic device 101. For example, in the case of a VoLTE call request, the communication processor 701 may set up a VoLTE call and, later, the VoLTE call may be terminated. The first network 702 may provide a measurement object of the second network communication to the communication processor 701 based on the termination of the VoLTE call. A DRB release including the second network measurement object may be transmitted based on the termination of the VoLTE call, but this is merely an example. The DRB release may be transmitted before or while setting up the VoLTE call.

Referring to FIG. 8B, according to an embodiment, the communication processor 701 may identify whether other network communication has been activated in operation 815. For example, the communication processor 701 may identify whether other network communication (e.g., Wi-Fi communication) has been activated based on the information received from the processor 120. Upon identifying that other network communication is activated (yes in 815), the communication processor 701 may skip measurement on the second network communication in operation 817. Thus, when user data is transmitted or received based on other network communication, unnecessary connection of the second network communication may be skipped. Further, the Internet PDN is maintained, so that data transmission/reception may be performed without delay even when Wi-Fi communication has a problem. Upon identifying that other network communication is not activated (no in 815), the communication processor 701 may perform measurement on the second network communication in operation 819. If the result of measurement meets the reporting condition, the communication processor 701 may report the measured parameter to the first network 702 in operation 821. The first network 702 may select a second network 703 (e.g., gNB) for SCG adding, based on the reported parameter. The first network 702 may transmit an RRC connection reconfiguration message for second network communication adding to the electronic device 101 in operation 823. The electronic device 101 may form a connection with the second network 703 selected based on information in the received RRC connection reconfiguration message, thereby setting up dual connectivity (DC) in operation 825.

The DRB release is merely an example of a trigger for determining whether to skip measurement, and the trigger for determining whether to skip measurement is not limited to a specific one. For example, the electronic device 101 may receive an RRC connection reconfiguration message including the measurement object of the second network communication from the first network 702 and, also in this case, the electronic device 101 may identify whether other network communication is activated. In the case where the other network communication is activated, the electronic device 101 may skip measurement on the measurement object included in the RRC connection reconfiguration message. According to an embodiment, it will be appreciated by one of ordinary skill in the art that the configuration of determining whether to skip measurement based on the DRB release may be replaced with the configuration of determining whether to skip measurement based on reception of a message including any measurement object.

According to an embodiment, the electronic device 101 may include an integrated SoC 620 supporting both the AP function and CP function in which case the operations of the processor 120 and the communication processor 701 may be performed by an integrated SoC 620.

According to an embodiment, in the case where other network communication is activated, measurement may be skipped so that current consumed by the measurement may be reduced. Further, in the case where other network communication is not activated, normal dual connectivity may be formed.

Figure 9:
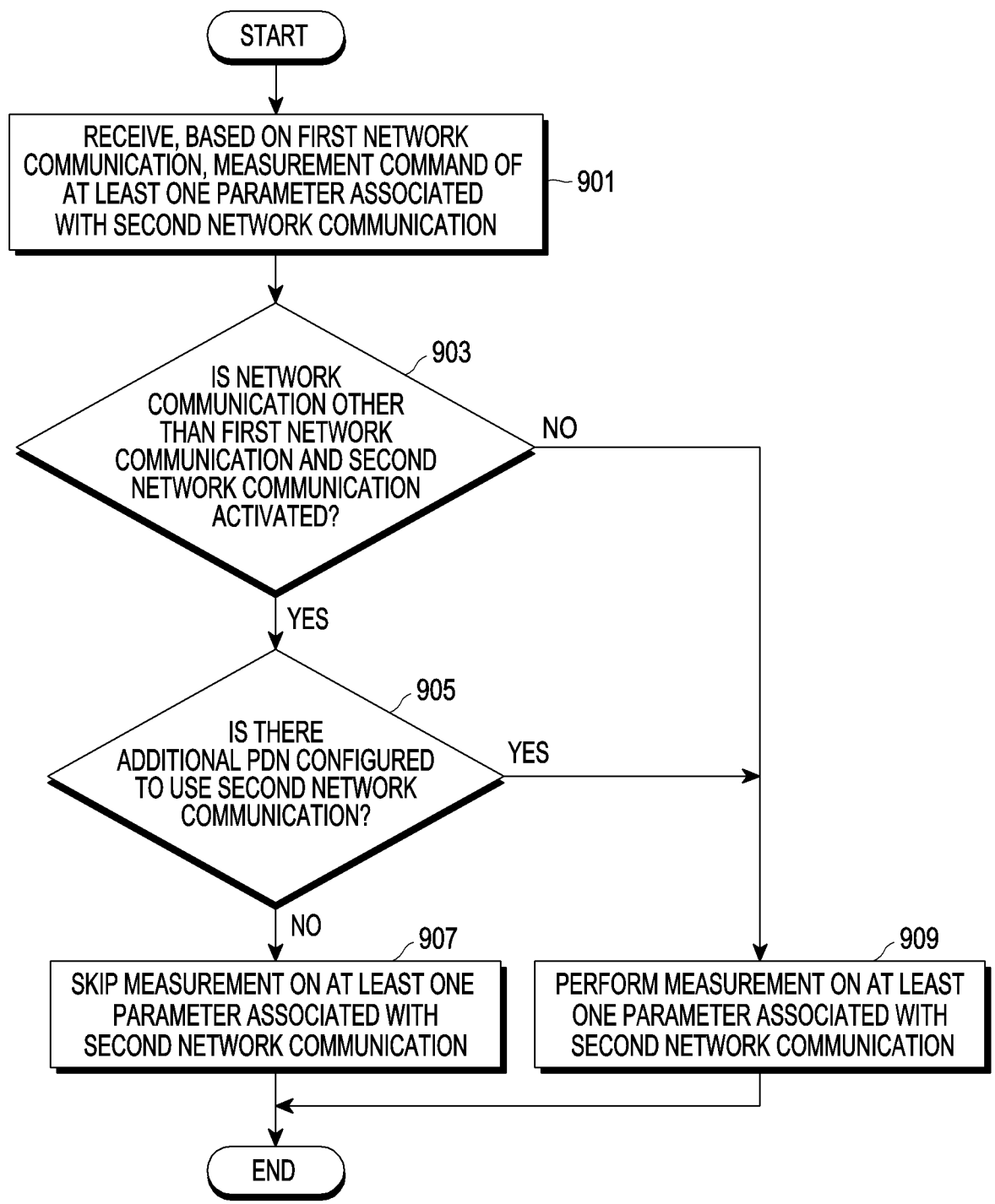
FIG. 9 is a flowchart illustrating example operations of an electronic device according to an embodiment.

FIG. 9 is a flowchart illustrating example operations of an electronic device according to an embodiment. Among the operations of FIG. 9, those already described above are briefly described below.

According to an embodiment, in operation 901, an electronic device 101 (e.g., at least one of the processor 120, the first communication processor 212, the second communication processor 214, the integrated communication processor 260, or the integrated SoC 620) may receive a measurement command of at least one parameter associated with second network communication based on first network communication. In operation 903, the electronic device 101 may identify whether network communication other than the first network communication and the second network communication is activated. For example, the electronic device 101 may identify whether Wi-Fi communication is activated. Upon identifying that other network communication is activated (yes in 903), the electronic device 101 may identify whether there is an additional packet data network (PDN) configured to use the second network communication (e.g., network communication corresponding to the SCG) in operation 905. For example, a hot spot PDN for the mobile access point (AP) function of the electronic device 101 may be configured to use the second network communication, and various PDNs may be configured to use the second network communication.

According to an embodiment, the electronic device 101 may manage a PDN list. The electronic device 101 may identify whether there is an additional PDN configured to use the second network communication other than the Internet PDN, based on the PDN list. For example, the electronic device 101 may identify whether there is an additional PDN configured to use the second network communication by identifying whether the identifier of the PDN list corresponds to the identifier configured to use the designated second network communication. For example, the electronic device 101 may identify whether there is an additional PDN configured to use the second network communication other than the Internet PDN, based on the quality-of-service (QoS) class identifier (QCI) per PDN. For example, at least one specific value of QCI may indicate that it is for data transmission/reception. The electronic device 101 may identify whether there is an additional PDN configured to use the second network communication other than the Internet PDN based on whether a PDN having a QCI of at least one specific value other than the Internet PDN is present on the PDN list. As another example, the electronic device 101 may store PDN identification information per operator. The electronic device 101 may also store information as to whether the per-operator PDN identification information is used by the second network communication and identify whether the activated PDN is configured to use the second network communication based on the stored information. It will be appreciated by one of ordinary skill in the art that the way of identifying whether it is the PDN configured to use the second network communication is not limited to a specific one. Further, for the electronic device 101 to identify whether there is an additional PDN configured to use the second network communication is merely an example. The electronic device 101 may identify whether there is a PDN meeting a preconfigured condition. The preconfigured condition may include any condition for triggering dual connectivity.

According to an embodiment, upon identifying that there is no additional PDN configured to use the second network communication (e.g., network communication corresponding to the SCG) (no in 905), the electronic device 101 may skip measurement on at least one parameter associated with the second network communication in operation 907. Since there is no need for using the second network communication, the electronic device 101 may skip measurement, preventing connection of the second network communication. Upon identifying that there is an additional PDN configured to use the second network communication (e.g., network communication corresponding to the SCG) (yes in 905), the electronic device 101 may perform measurement on at least one parameter associated with the second network communication in operation 909. When the measured parameter meets the reporting condition, the electronic device 101 may perform reporting and then connect the second network communication.

According to an embodiment, although other network communication (e.g., Wi-Fi communication) is deactivated, the electronic device 101 may provide dual connectivity if the PDN requiring second network communication is activated.

Figure 10A:
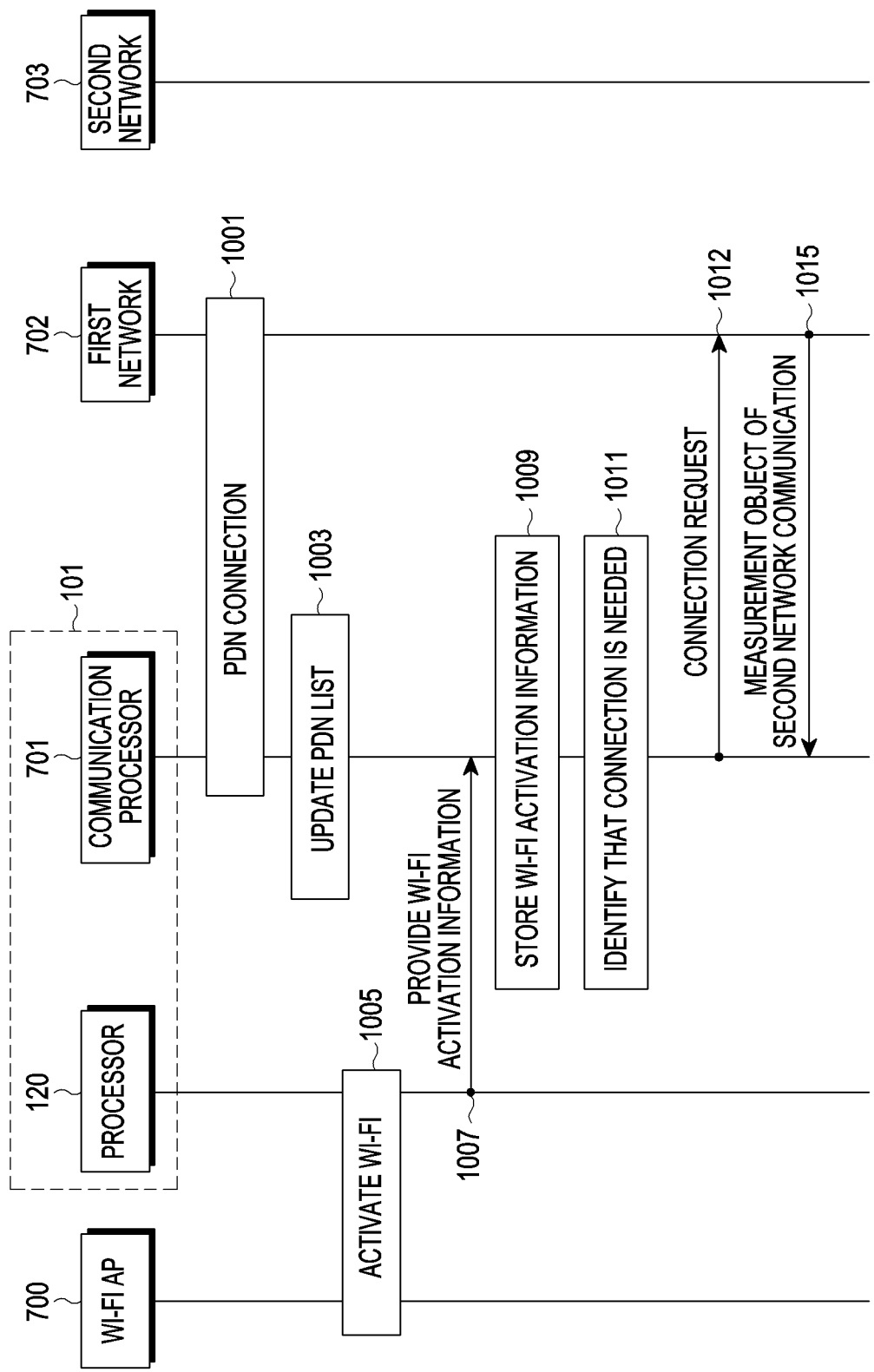
FIGS. 10A and 10B are signal flow diagrams illustrating example operations of an electronic device according to an embodiment.
Figure 10B:
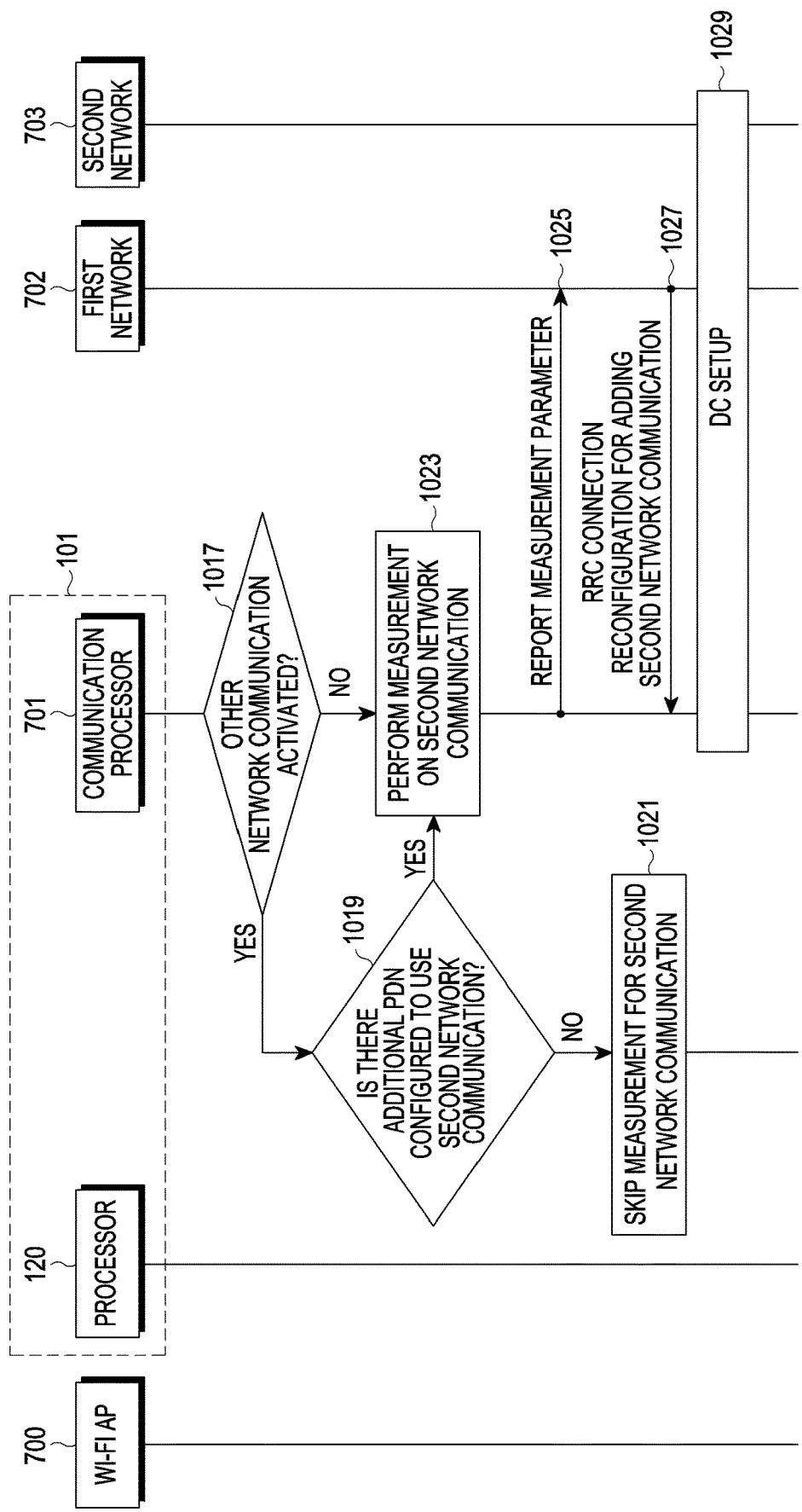

FIGS. 10A and 10B are signal flow diagrams illustrating example operations of an electronic device according to an embodiment. Among the operations of FIGS. 10A and 10B, those already described above are briefly described below.

According to an embodiment, the communication processor 701 (e.g., at least one of the first communication processor 212, the second communication processor 214, or the integrated communication processor 260) may form a PDN connection with the first network 702 in operation 1001. In operation 1003, the communication processor 701 may update the PDN list. The PDN list may include information about the currently activated PDNs. Table 2 illustrates an example PDN list according to an embodiment.

TABLE 2

| APN | whether activated | configured to use second network |
|---|---|---|
| <APN>XXINTERNTET</APN> | activated | used |
| <APN>XXWADMIN</APN> | activated | used |
| <APN>XXWAPP</APN> | deactivated | used |
| <APN>IMS</APN> | activated | not used |
| <APN>EPDN</APN> | activated | not used |
| <APN>HOTSPOT</APN> | deactivated | used |

The PDN identifier may be an APN. Whether activated per PDN may be recorded on the PDN list as shown in, e.g., Table 2. If any PDN is activated/deactivated, the electronic device 101 may update whether the APN corresponding to the PDN is activated. The second network use configuration is related to whether to use the second network per PDN and this may be previously stored in the electronic device 101.

In operation 1005, the processor 120 may form a Wi-Fi connection with the Wi-Fi AP 700, thereby activating the Wi-Fi communication. The processor 120 may activate the Wi-Fi communication with the Wi-Fi AP 700 via the Wi-Fi module. According to an embodiment, the Wi-Fi module may be included in the AP 700. The electronic device 101 may transmit or receive user data via the Wi-Fi communication. The processor 120 may provide Wi-Fi activation information to the communication processor 701 in operation 1007. The communication processor 701 may store the Wi-Fi activation information in operation 1009. In operation 1011, the communication processor 701 may identify that connection is needed. The communication processor 701 may transfer the connection request to the first network 702 in operation 1012. In operation 1015, the first base station 701 may transmit a measurement object of the second network communication to the electronic device 101.

Referring to FIG. 10B, according to an embodiment, the communication processor 701 may identify whether other network communication has been activated in operation 1017. For example, the communication processor 701 may identify whether other network communication (e.g., Wi-Fi communication) has been activated based on the information received from the processor 120. Upon identifying that other network communication is activated (yes in 1017), the communication processor 701 may identify whether there is an additional PDN configured to use the second network communication in operation 1019. Upon identifying that there is no additional PDN configured to use the second network communication (no in 1019), the communication processor 701 may skip measurement on the second network communication in operation 1021. Upon identifying that other network communication is not activated (no in 1017) or there is an additional PDN configured to use the second network communication (yes in 1019), the communication processor 701 may perform measurement on the second network communication in operation 1023. For example, on the PDN list of Table 2, among the PDNs configured to use the second network communication, it may be identified that the PDN (e.g., <APN>XXWADMIN</APN>) except for the Internet PDN (e.g., <APN>XXINTERNTET</APN>) is activated, and the electronic device 101 may perform measurement on the second network communication. If the result of measurement meets the reporting condition, the communication processor 701 may report the measured parameter to the first network 702 in operation 1025. The first network 702 may select a second network 703 for SCG adding, based on the reported parameter. The first network 702 may transmit an RRC connection reconfiguration message for second network communication adding to the electronic device 101 in operation 1027. The electronic device 101 may form a connection with the base station (e.g., the second network 703) selected based on information in the received RRC connection reconfiguration message, thereby setting up dual connectivity (DC) in operation 1029. According to an embodiment, the electronic device 101 may include an integrated SoC 620 supporting both the AP function and CP function in which case the operations of the processor 120 and the communication processor 701 may be performed by an integrated SoC 620.

As described above, although other network communication (e.g., Wi-Fi communication) is deactivated, the electronic device 101 may provide dual connectivity if the PDN requiring second network communication is activated.

Figure 11:
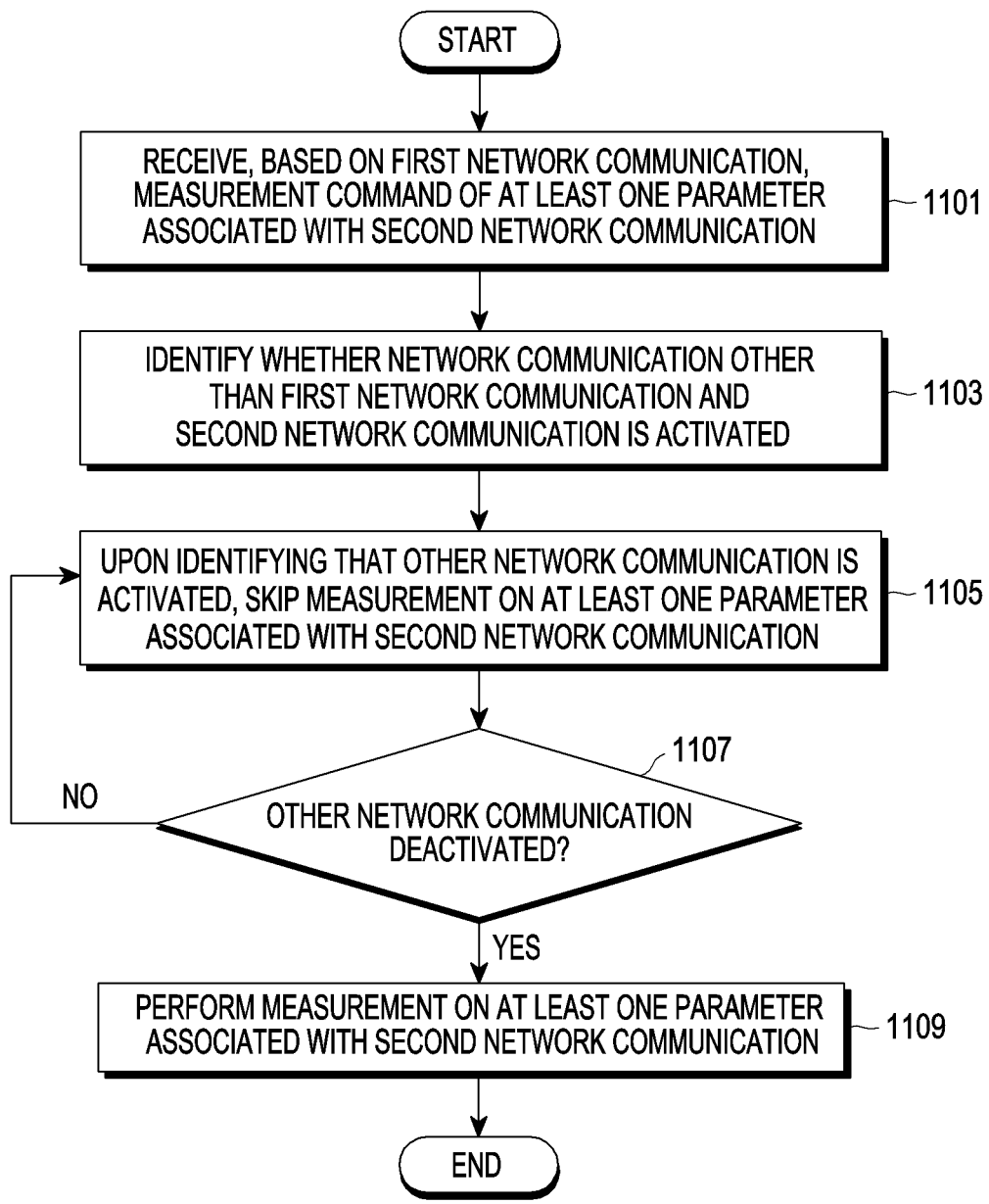
FIG. 11 is a flowchart illustrating example operations of an electronic device according to an embodiment.

FIG. 11 is a flowchart illustrating example operations of an electronic device according to an embodiment. Among the operations of FIG. 11, those already described above are briefly described below.

According to an embodiment, in operation 1101, an electronic device 101 (e.g., at least one of the processor 120, the first communication processor 212, the second communication processor 214, the integrated communication processor 260, or the integrated SoC 620) may receive a measurement command of at least one parameter associated with second network communication based on first network communication. In operation 1103, the electronic device 101 may identify whether other network communication than the first network communication and the second network communication is activated. For example, the electronic device 101 may identify whether Wi-Fi communication is activated. Upon identifying that other network communication is activated, the electronic device 101 may skip measurement on at least one parameter associated with the second network communication in operation 1105. Since there is no need for using the second network communication, the electronic device 101 may skip measurement, preventing connection of the second network communication.

According to an embodiment, the electronic device 101 may identify whether other network communication is deactivated in operation 1107. For example, the electronic device 101 may deactivate other network communication based on a Wi-Fi deactivation command. As the electronic device 101 leaves the coverage of the Wi-Fi AP, other network communication may be deactivated. There is no specific reason why the other network communication is deactivated. If the other network communication remains activated (no in 1107), the electronic device 101 may keep on skipping measurement. Upon identifying that the other network communication is deactivated (yes in 1107), the electronic device 101 may perform measurement on at least one parameter associated with the second network communication in operation 1109.

According to an embodiment, the electronic device 101 may provide dual connectivity if the other network communication (e.g., Wi-Fi communication) is deactivated later.

Figure 12A:
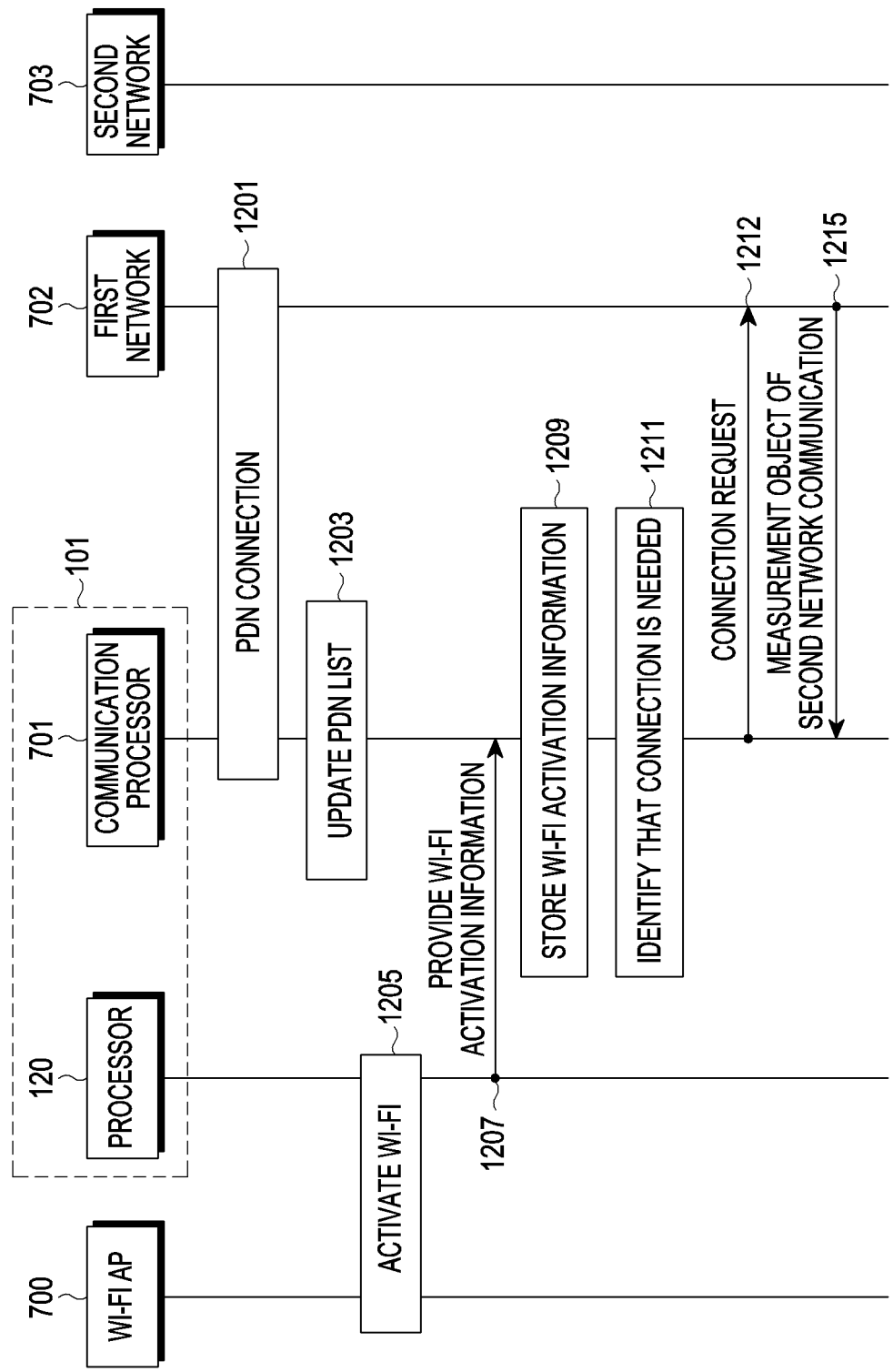
FIGS. 12A and 12B are signal flow diagrams illustrating example operations of an electronic device according to an embodiment.
Figure 12B:
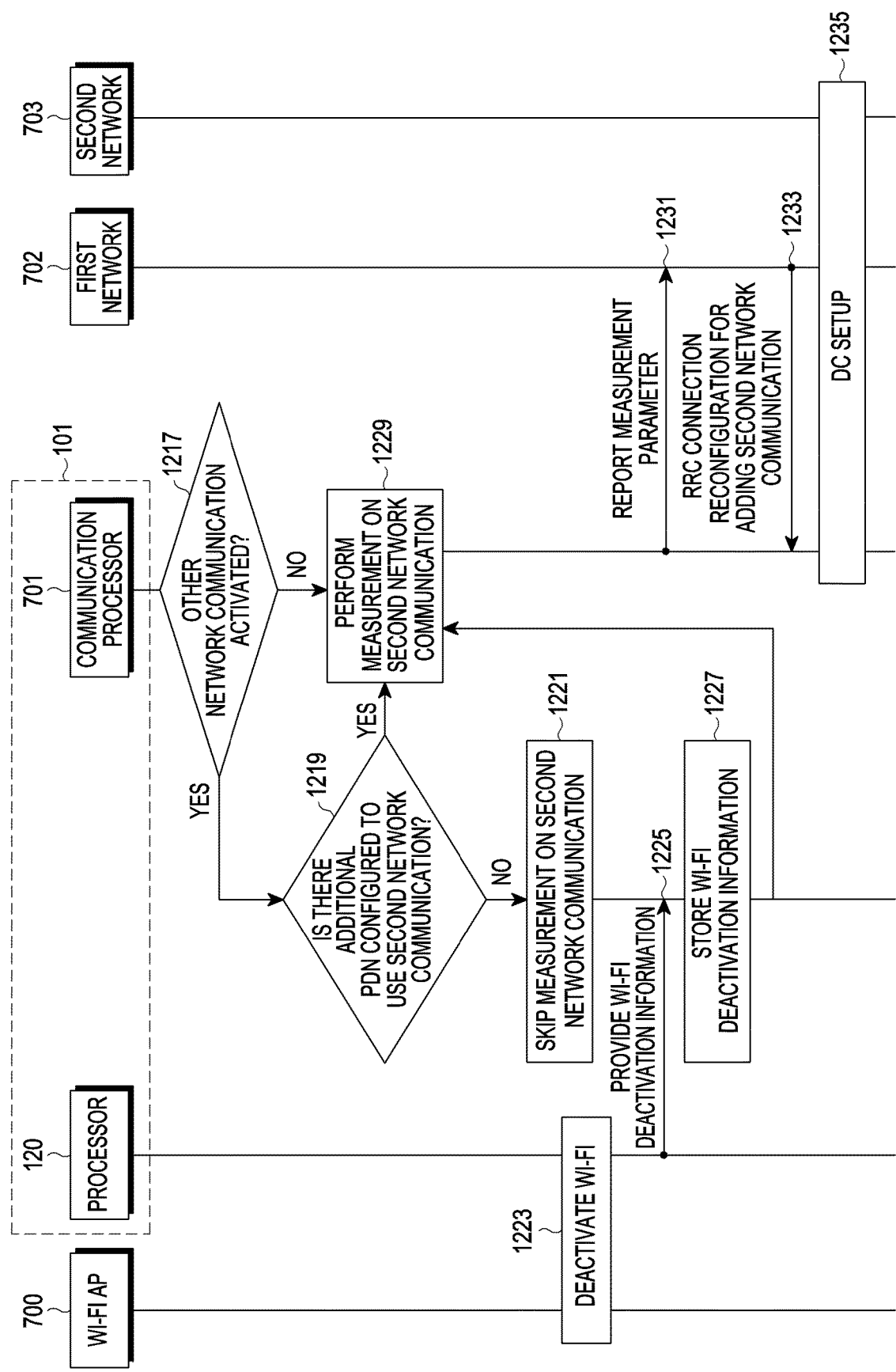

FIGS. 12A and 12B are signal flow diagrams illustrating example operations of an electronic device according to an embodiment. Among the operations of FIGS. 12A and 12B, those already described above are briefly described below.

According to an embodiment, the communication processor 701 (e.g., at least one of the first communication processor 212, the second communication processor 214, or the integrated communication processor 260) may form a PDN connection with the first network 702 in operation 1201. In operation 1203, the communication processor 701 may update the PDN list. The PDN list may include information about the currently activated PDNs. In operation 1205, the processor 120 may form a Wi-Fi connection with the Wi-Fi AP 700, thereby activating the Wi-Fi communication. The processor 120 may activate the Wi-Fi communication with the Wi-Fi AP 700 via the Wi-Fi module. As described above, the Wi-Fi module may be included in the AP 700. The electronic device 101 may transmit or receive user data via the Wi-Fi communication. The processor 120 may provide Wi-Fi activation information to the communication processor 701 in operation 1207. The communication processor 701 may store the Wi-Fi activation information in operation 1209. In operation 1211, the communication processor 701 may identify that connection is needed. The communication processor 701 may transfer the connection request to the first network 702 in operation 1212. In operation 1215, the first base station 701 may transmit a measurement object of the second network communication to the electronic device 101.

Referring to FIG. 12B, according to an embodiment, the communication processor 701 may identify whether other network communication has been activated in operation 1217. For example, the communication processor 701 may identify whether other network communication (e.g., Wi-Fi communication) has been activated based on the information received from the processor 120. Upon identifying that other network communication is activated (yes in 1217), the communication processor 701 may identify whether there is an additional PDN configured to use the second network communication in operation 1219. Upon identifying that there is no additional PDN configured to use the second network communication (no in 1219), the communication processor 701 may skip measurement on the second network communication in operation 1021. Upon identifying that other network communication is not activated (no in 1217) or there is an additional PDN configured to use the second network communication (yes in 1219), the communication processor 701 may perform measurement on the second network communication in operation 1229.

According to an embodiment, while skipping measurement on the second network communication, the processor 120 may deactivate Wi-Fi communication in operation 1223. In operation 1225, the processor 120 may provide information (e.g., a flag) indicating that the Wi-Fi communication has been deactivated to the communication processor 701. In operation 1227, the communication processor 701 may store deactivation information for Wi-Fi communication. Upon identifying that Wi-Fi communication has been deactivated, the communication processor 701 may perform measurement on the second network communication in operation 1229. If the result of measurement meets the reporting condition, the communication processor 701 may report the measured parameter to the first network 702 in operation 1231. The first network 702 may select a second network 703 for SCG adding, based on the reported parameter. The first network 702 may transmit an RRC connection reconfiguration message for second network communication adding to the electronic device 101 in operation 1233. The electronic device 101 may form a connection with the base station (e.g., the second network 703) selected based on information in the received RRC connection reconfiguration message, thereby setting up dual connectivity (DC) in operation 1235. According to an embodiment, the electronic device 101 may include an integrated SoC 620 supporting both the AP function and CP function in which case the operations of the processor 120 and the communication processor 701 may be performed by an integrated SoC 620.

According to an embodiment, the electronic device 101 may provide dual connectivity if the other network communication (e.g., Wi-Fi communication) is deactivated later.

Figure 13:
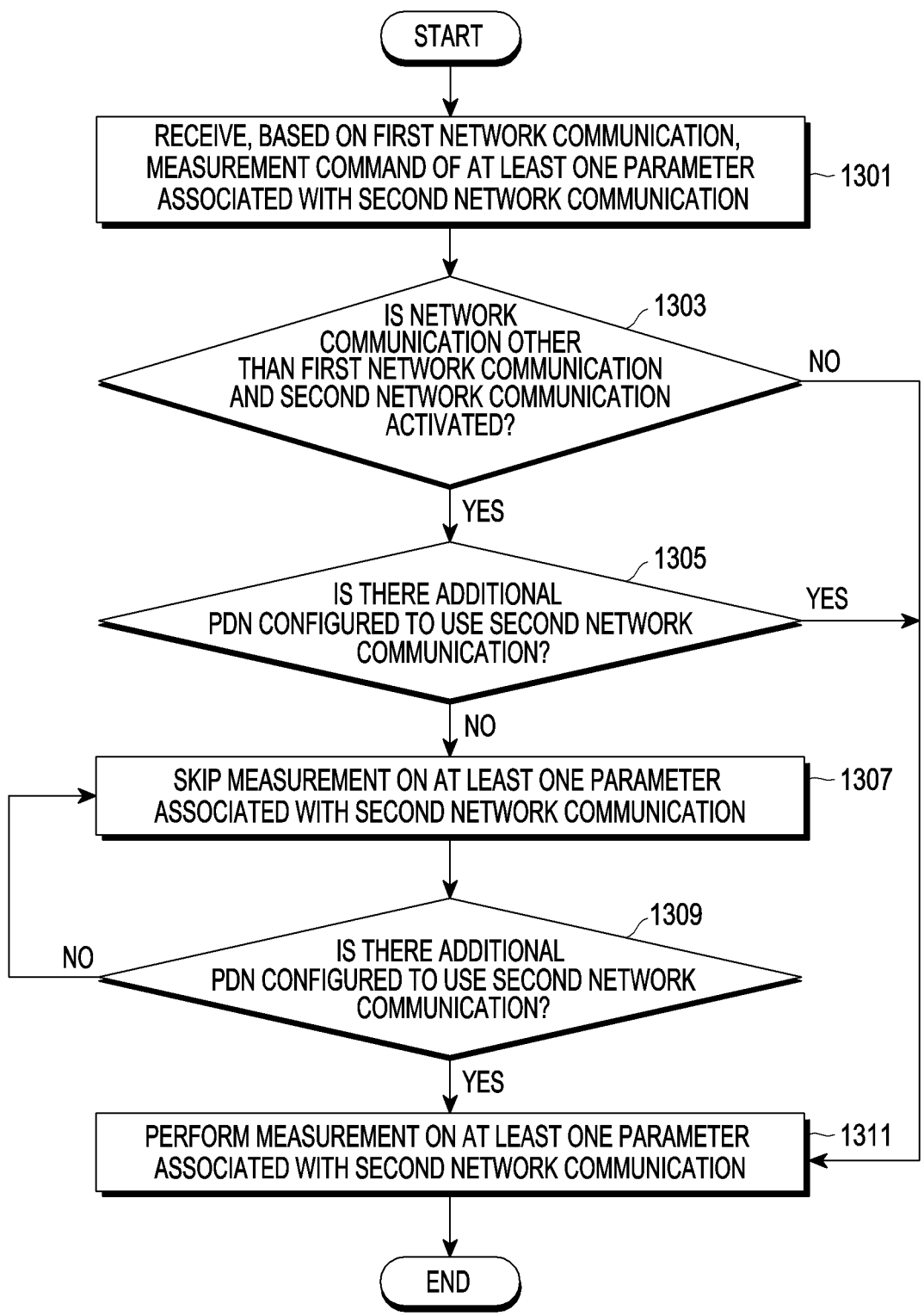
FIG. 13 is a flowchart illustrating example operations of an electronic device according to an embodiment.

FIG. 13 is a flowchart illustrating example operations of an electronic device according to an embodiment. Among the operations of FIG. 13, those already described above are briefly described below.

According to an embodiment, in operation 1301, an electronic device 101 (e.g., at least one of the processor 120, the first communication processor 212, the second communication processor 214, the integrated communication processor 260, or the integrated SoC 620) may receive a measurement command of at least one parameter associated with second network communication based on first network communication. In operation 1303, the electronic device 101 may identify whether network communication other than the first network communication and the second network communication is activated. For example, the electronic device 101 may identify whether Wi-Fi communication is activated. Upon identifying that other network communication is activated (yes in 1303), the electronic device 101 may identify whether there is an additional PDN configured to use the second network communication in operation 1305. Upon identifying that there is no additional PDN configured to use the second network communication (no in 1305), the electronic device 101 may skip measurement on at least one parameter associated with the second network communication in operation 1307. Upon identifying that the other network communication is deactivated (no in 1303) or there is an additional PDN (yes in 1305), the electronic device 101 may perform measurement on at least one parameter associated with the second network communication in operation 1311.

According to an embodiment, while skipping measurement on at least one parameter associated with the second network communication, the electronic device 101 may identify whether an additional PDN configured to use the second network communication is added in operation 1309. For example, the electronic device 101 may obtain a hot spot function activate command and, based thereupon, activate the PDN corresponding to the hot spot PDN. Upon identifying that the additional PDN configured to use the second network communication is added (yes in 1309), the electronic device 101 may perform measurement on at least one parameter associated with the second network communication in operation 1311.

According to an embodiment, although other network communication (e.g., Wi-Fi communication) is deactivated, the electronic device 101 may provide dual connectivity if the PDN requiring use of the second network communication later is activated.

Figure 14A:
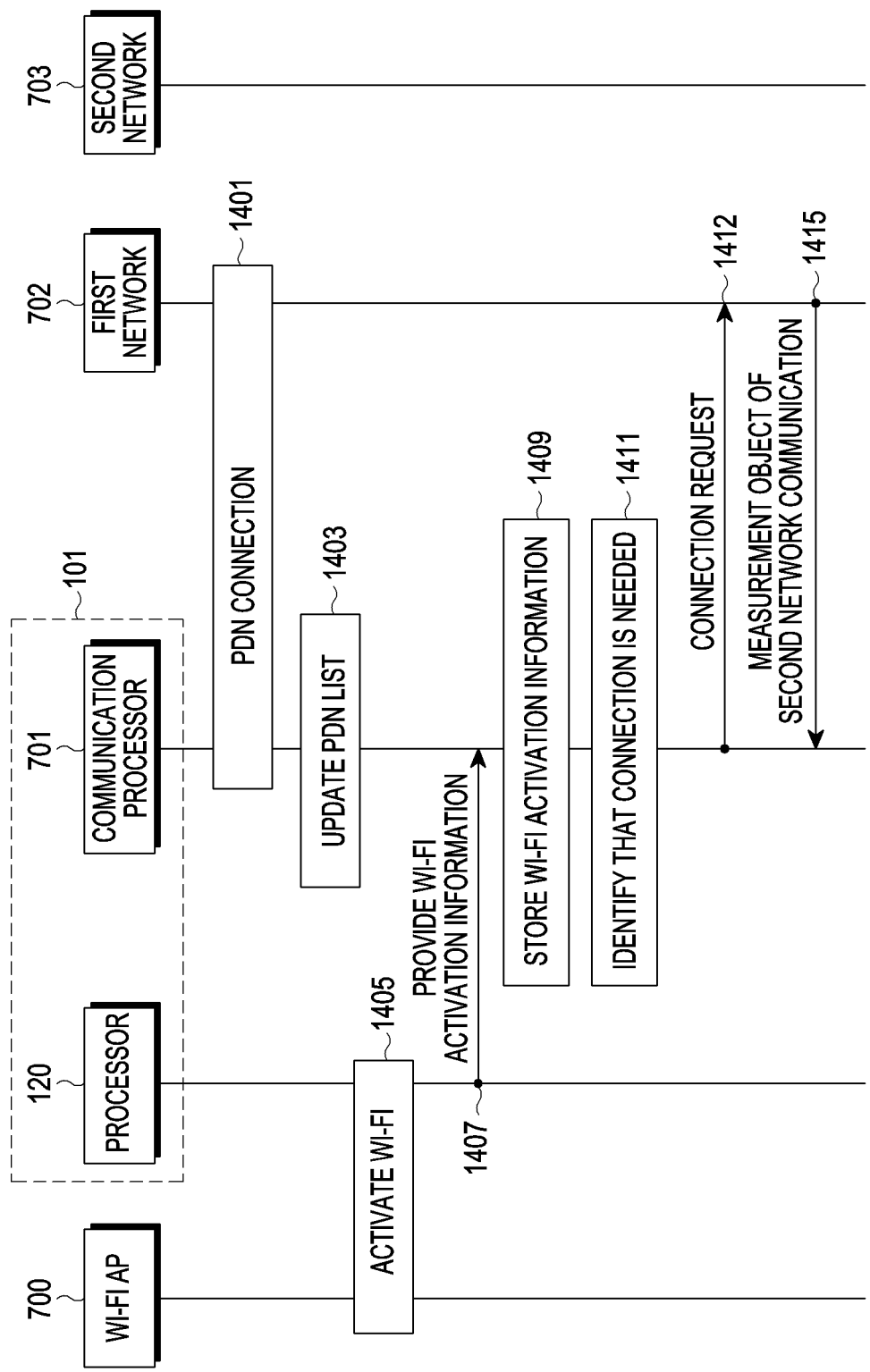
FIGS. 14A and 14B are signal flow diagrams illustrating example operations of an electronic device according to an embodiment.
Figure 14B:
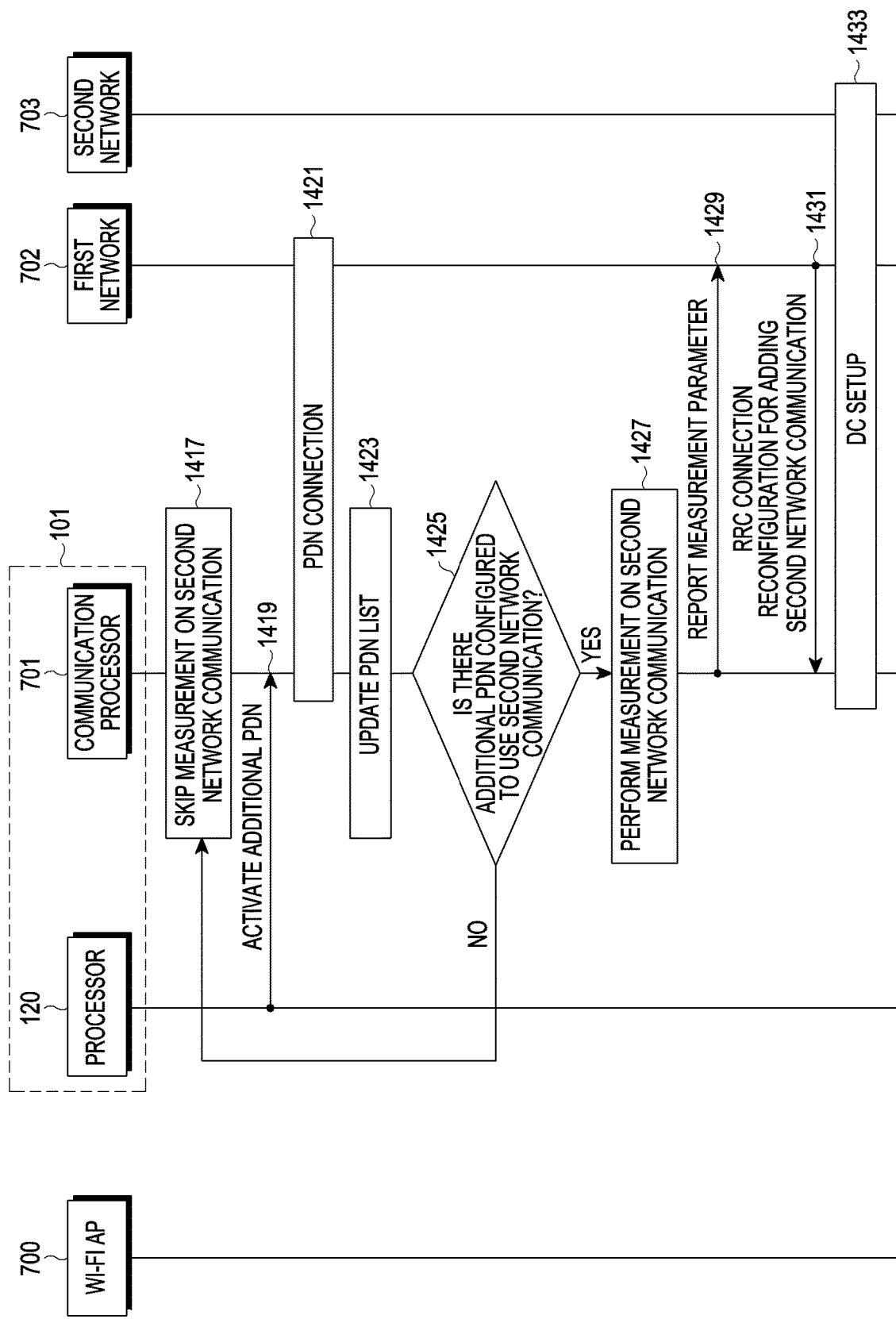

FIGS. 14A and 14B are signal flow diagrams illustrating example operations of an electronic device according to an embodiment. Among the operations of FIGS. 14A and 14B, those already described above are briefly described below.

According to an embodiment, the communication processor 701 (e.g., at least one of the first communication processor 212, the second communication processor 214, or the integrated communication processor 260) may form a PDN connection with the first network 702 in operation 1401. In operation 1403, the communication processor 701 may update the PDN list. The PDN list may include information about the currently activated PDNs. In operation 1405, the processor 120 may form a Wi-Fi connection with the Wi-Fi AP 700, thereby activating the Wi-Fi communication. The processor 120 may activate the Wi-Fi communication with the Wi-Fi AP 700 via the Wi-Fi module. As described above, the Wi-Fi module may be included in the AP 700. The electronic device 101 may transmit or receive user data via the Wi-Fi communication. The processor 120 may provide Wi-Fi activation information to the communication processor 701 in operation 1407. The communication processor 701 may store the Wi-Fi activation information in operation 1409. In operation 1411, the communication processor 701 may identify that connection is needed. The communication processor 701 may transfer the connection request to the first network 702 in operation 1412. In operation 1415, the first base station 701 may transmit a measurement object of the second network communication to the electronic device 101. Upon identifying that other network communication is activated or an additional PDN is deactivated, the communication processor 701 may skip measurement on the second network communication in operation 1417 (refer to FIG. 14B).

Referring to FIG. 14B, according to an embodiment, the processor 120 may provide information about activation of the additional PDN to the communication processor 701 in operation 1419. For example, the processor 120 may obtain a hot spot function activate command and provide information about activation of the additional PDN corresponding to the hot spot PDN to the communication processor 701. The communication processor 701 may form a PDN connection for the additional PDN in operation 1421. For example, the electronic device 101 may form a PDN connection for the additional PDN by transmitting or receiving a PDN connectivity request message, an activate default EPS bearer context message, or an activate default EPS bearer context accept message with the network. In operation 1423, the communication processor 701 may update the PDN list. For example, the communication processor 701 may update the PDN list by adding information about the additional PDN corresponding to the hot spot PDN. In operation 1425, the communication processor 701 may identify whether there is an additional PDN configured to use the second network communication based on the updated PDN list. For example, the electronic device 101 may update whether the hot spot PDN (e.g., <APN>HOTSPOT</APN>in Table 2) is activated from the deactivated state to the activated state on the PDN list as shown in Table 2. Upon identifying that there is no additional PDN configured to use the second network communication (no in 1425), the electronic device 101 may keep on skipping measurement on the second network communication. Upon identifying that there is an additional PDN configured to use the second network communication (yes in 1425), the communication processor 701 may perform measurement on the second network communication in operation 1427. If the result of measurement meets the reporting condition, the communication processor 701 may report the measured parameter to the first network 702 in operation 1429. The first network 702 may select a second network 703 for SCG adding, based on the reported parameter. The first network 702 may transmit an RRC connection reconfiguration message for second network communication adding to the electronic device 101 in operation 1431. The electronic device 101 may form a connection with the base station (e.g., the second network 703) selected based on information in the received RRC connection reconfiguration message, thereby setting up dual connectivity (DC) in operation 1433. According to an embodiment, the electronic device 101 may include an integrated SoC 620 supporting both the AP function and CP function in which case the operations of the processor 120 and the communication processor 701 may be performed by an integrated SoC 620.

According to an embodiment, before performing measurement in operation 1427, the electronic device 101 may identify whether the measurement object is still valid and, if still valid, it may be configured to perform measurement in operation 1427. For example, the electronic device 101 may identify whether the measurement identifier is valid. The measurement identifier is an identifier that may be deleted out when the electronic device 101 hands over. The electronic device 101 may identify whether the measurement object is still valid based on whether the measurement identifier has been deleted.

According to an embodiment, although other network communication (e.g., Wi-Fi communication) is deactivated, the electronic device 101 may provide dual connectivity if the PDN requiring use of the second network communication later is activated.

Figure 15:
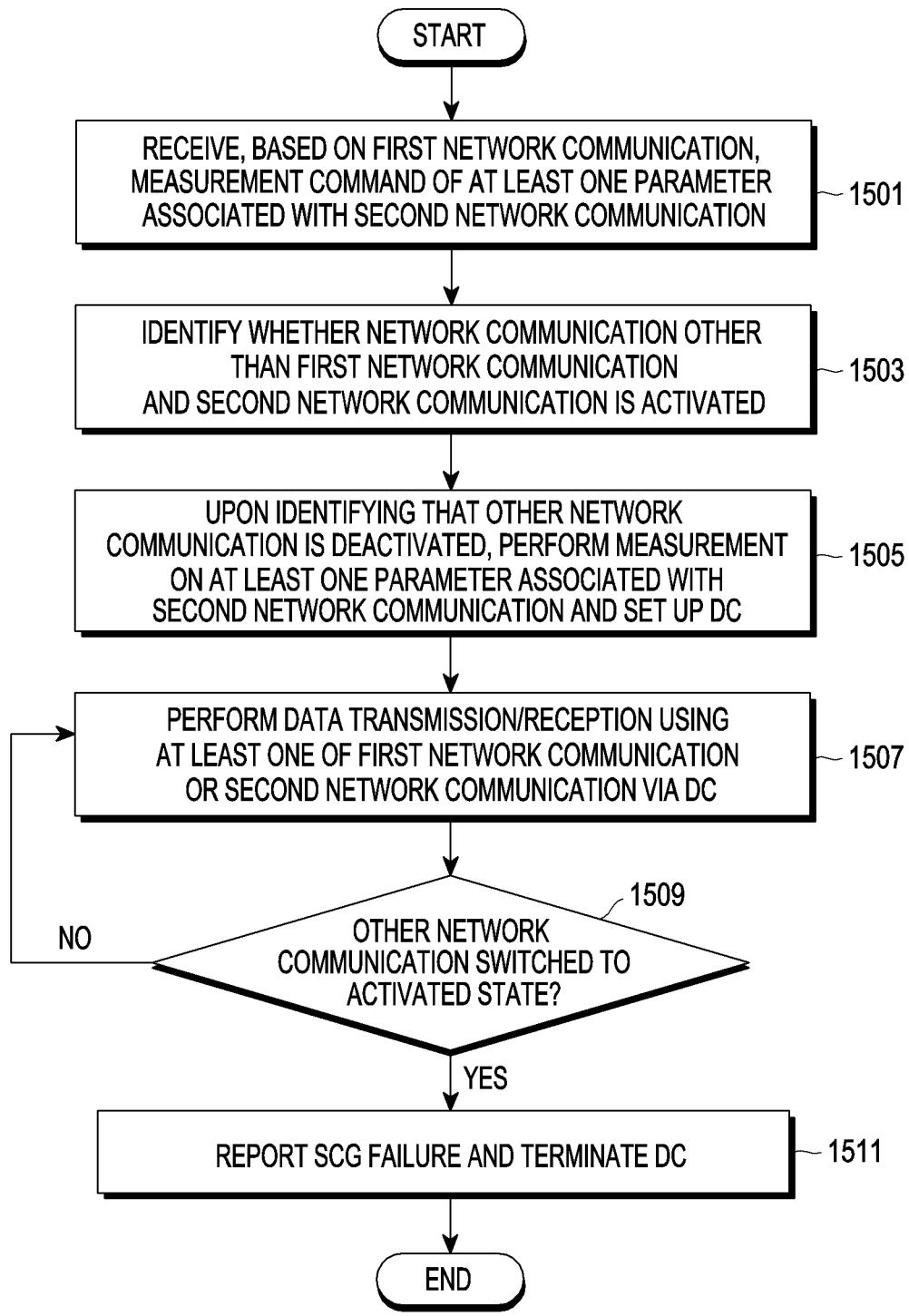
FIG. 15 is a flowchart illustrating example operations of an electronic device according to an embodiment.

FIG. 15 is a flowchart illustrating example operations of an electronic device according to an embodiment. Among the operations of FIG. 15, those already described above are briefly described below.

According to an embodiment, in operation 1501, an electronic device 101 (e.g., at least one of the processor 120, the first communication processor 212, the second communication processor 214, the integrated communication processor 260, or the integrated SoC 620) may receive a measurement command of at least one parameter associated with second network communication based on first network communication. In operation 1503, the electronic device 101 may identify whether network communication other than the first network communication and the second network communication is activated. For example, the electronic device 101 may identify whether Wi-Fi communication is activated. Upon identifying that other network communication has been deactivated, the electronic device 101 may perform measurement on at least one parameter associated with the second network communication and set up dual connectivity (DC) in operation 1505. For example, the electronic device 101 may report the measured parameter and perform an SCG add procedure for the corresponding base station. In operation 1507, the electronic device 101 may perform data transmission/reception using at least one of the first network communication or second network communication via dual connectivity. In operation 1509, the electronic device 101 may identify whether the other network communication switches to the activated state. Unless the other network communication switches to the activated state (no in 1509), the electronic device 101 may maintain data transmission/reception via the DC. If the other network communication switches to the activated state (yes in 1509), the electronic device 101 may report an SCG failure and terminate dual connectivity in operation 1511. Thereafter, the electronic device 101 may skip measurement based on activation of other network communication although receiving the measurement command of at least one parameter associated with the second network communication.

According to an embodiment, after dual connectivity is formed, upon identifying activation of the other network communication (e.g., Wi-Fi communication), the electronic device 101 may release unnecessary second network communication, thereby reducing resource waste.

Figure 16A:
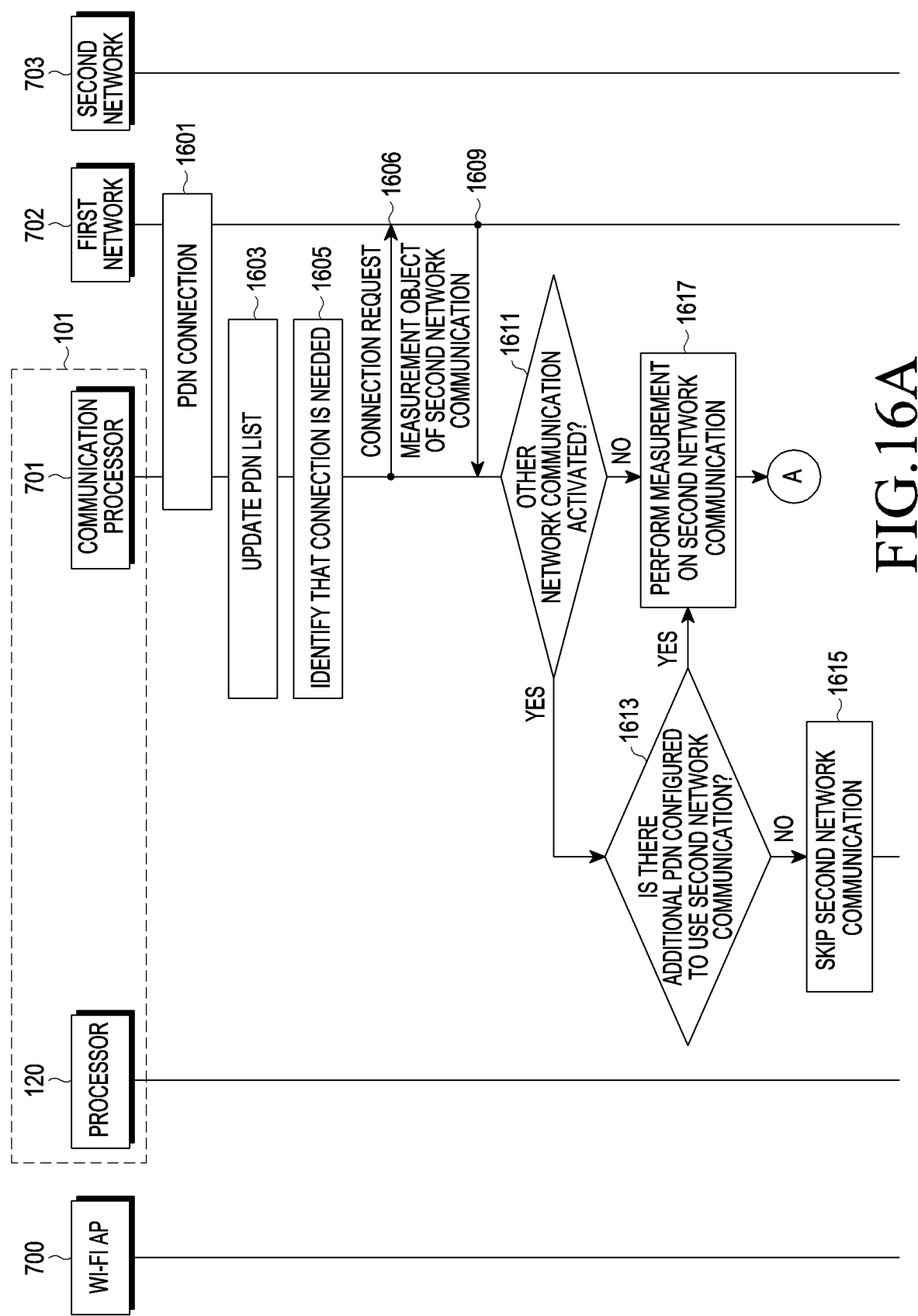
FIGS. 16A and 16B are signal flow diagrams illustrating example operations of an electronic device according to an embodiment.
Figure 16B:
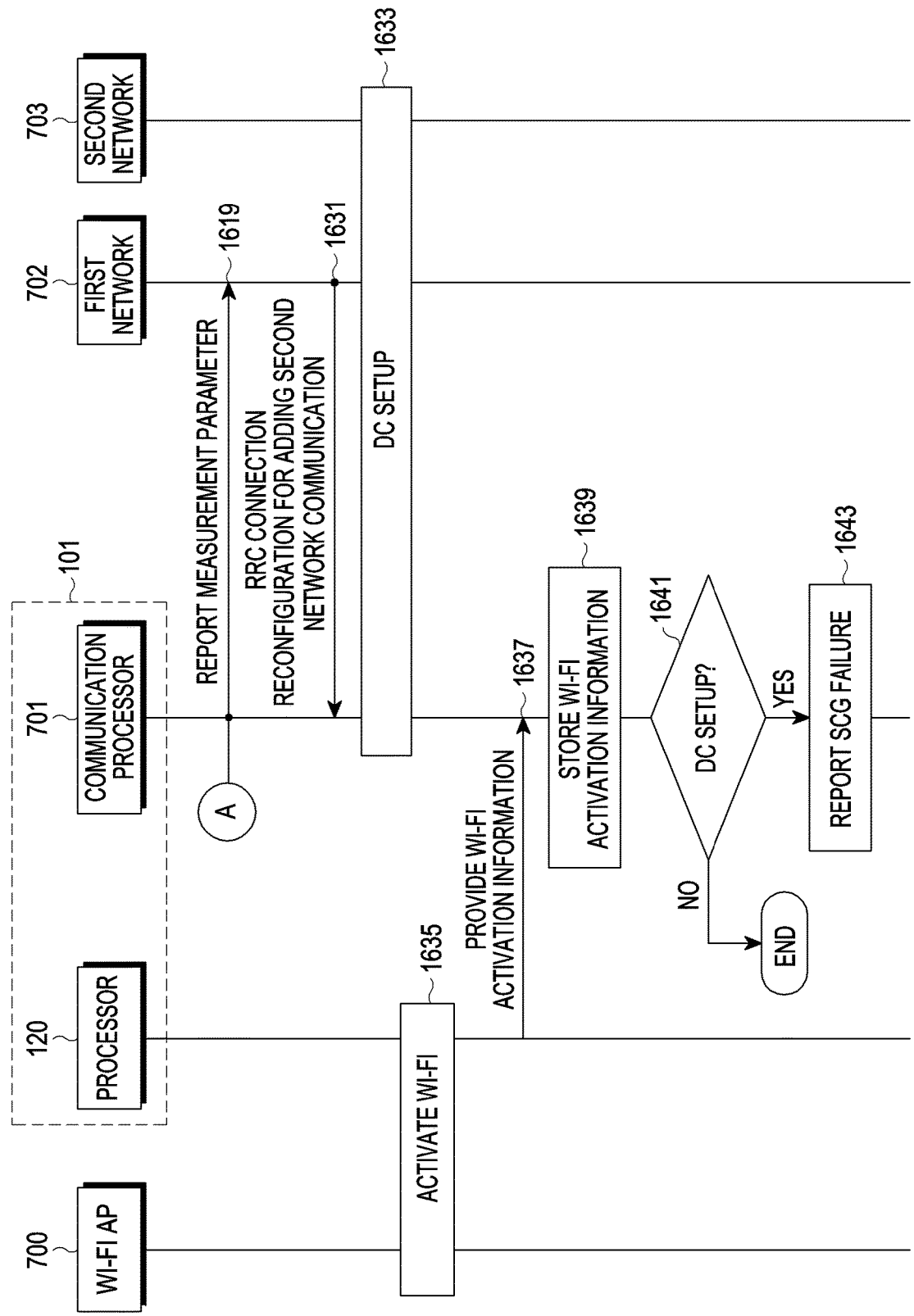

FIGS. 16A and 16B are signal flow diagrams illustrating example operations of an electronic device according to an embodiment. Among the operations of FIGS. 16A and 16B, those already described above are briefly described below.

According to an embodiment, the communication processor 701 (e.g., at least one of the first communication processor 212, the second communication processor 214, or the integrated communication processor 260) may form a PDN connection with the first network 702 in operation 1601. In operation 1603, the communication processor 701 may update the PDN list. The PDN list may include information about the currently activated PDNs. In operation 1605, the communication processor 701 may identify that connection is needed. The communication processor 701 may transfer the connection request to the first network 702 in operation 1606. In operation 1609, the first base station 701 may transmit a measurement object of the second network communication to the electronic device 101. In operation 1611, the communication processor 701 may identify whether other network communication has been activated. Upon identifying that other network communication is activated (yes in 1611), the communication processor 701 may identify whether there is an additional PDN configured to use the second network communication in operation 1613. If there is no additional PDN (no in 1613), the communication processor 701 may skip measurement on the second network communication in operation 1615. Upon identifying that other network communication is not activated (no in 1611), the communication processor 701 may skip measurement on the second network communication in operation 1617. If the result of measurement meets the reporting condition, the communication processor 701 may report the measured parameter to the first network 702 in operation 1619. The first network 702 may select a second network 703 for SCG adding, based on the reported parameter. The first network 702 may transmit an RRC connection reconfiguration message for second network communication adding to the electronic device 101 in operation 1631. The electronic device 101 may form a connection with the base station (e.g., the second network 703) selected based on information in the received RRC connection reconfiguration message, thereby setting up dual connectivity (DC) in operation 1633.

According to an embodiment, in operation 1635, the processor 120 may form a Wi-Fi connection with the Wi-Fi AP 700, thereby activating the Wi-Fi communication. The processor 120 may activate the Wi-Fi communication with the Wi-Fi AP 700 via the Wi-Fi module. As described above, the Wi-Fi module may be included in the AP 700. The electronic device 101 may transmit or receive user data via the Wi-Fi communication. The processor 120 may provide Wi-Fi activation information to the communication processor 701 in operation 1637. The communication processor 701 may store the Wi-Fi activation information in operation 1639. The communication processor 701 may identify whether dual connectivity has been set up in operation 1641. Unless dual connectivity is set up (no in 1641), the communication processor 701 may operate while maintaining the current state. When dual connectivity is set up (yes in 1641), the communication processor 701 may perform SCG failure reporting in operation 1643. Thus, the second network communication may be released. According to an embodiment, the electronic device 101 may include an integrated SoC 620 supporting both the AP function and CP function in which case the operations of the processor 120 and the communication processor 701 may be performed by an integrated SoC 620.

According to an embodiment, after dual connectivity is formed, upon identifying activation of the other network communication (e.g., Wi-Fi communication), the electronic device 101 may release unnecessary second network communication, thereby reducing resource waste.

Figure 17:
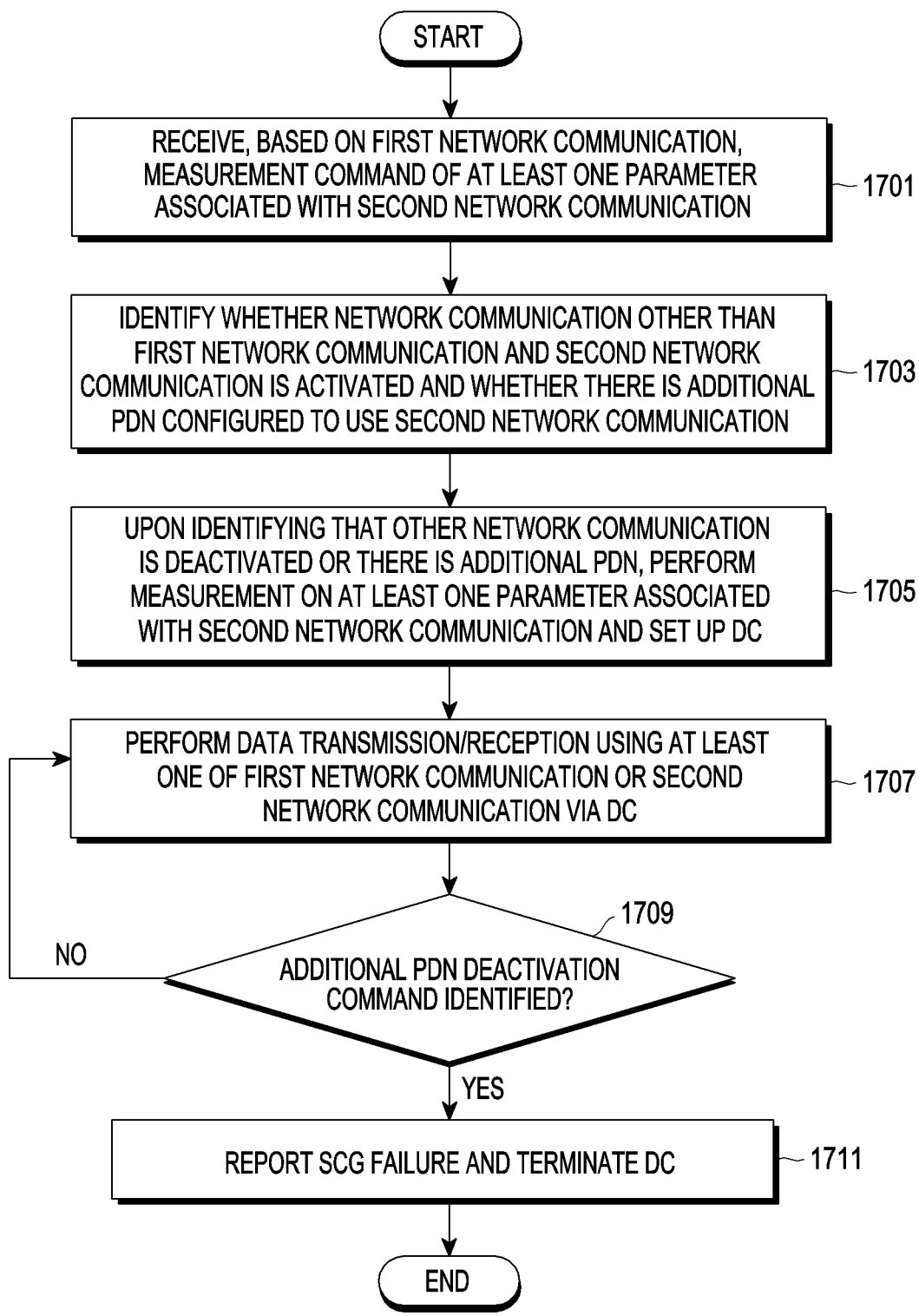
FIG. 17 is a flowchart illustrating example operations of an electronic device according to an embodiment.

FIG. 17 is a flowchart illustrating example operations of an electronic device according to an embodiment. Among the operations of FIG. 17, those already described above are briefly described below.

According to an embodiment, in operation 1701, an electronic device 101 (e.g., at least one of the processor 120, the first communication processor 212, the second communication processor 214, the integrated communication processor 260, or the integrated SoC 620) may receive a measurement command of at least one parameter associated with second network communication based on first network communication. In operation 1703, the electronic device 101 may identify whether network communication other than the first network communication and the second network communication is activated and whether there is an additional PDN configured to use the second network communication. Upon identifying that other network communication has been deactivated or there is an additional PDN, the electronic device 101 may perform measurement on at least one parameter associated with the second network communication and set up dual connectivity in operation 1705. For example, the electronic device 101 may report the measured parameter and perform an SCG add procedure for the corresponding base station. In operation 1707, the electronic device 101 may perform data transmission/reception using at least one of the first network communication or second network communication via dual connectivity.

According to an embodiment, the electronic device 101 may determine whether the additional PDN deactivate command is identified in operation 1709. For example, the electronic device 101 may receive a command to deactivate the hot spot function in the state of having activated the PDN corresponding to the hot spot PDN, as the additional PDN. If the additional PDN deactivate command is identified (yes in 1709), the electronic device 101 may report an SCG failure and terminate dual connectivity.

According to an embodiment, even after dual connectivity is formed, upon identifying deactivation of the PDN (e.g., the PDN corresponding to the hot spot PDN) requiring second network communication, the electronic device 101 may release unnecessary second network communication, thereby reducing resource waste.

Figure 18:
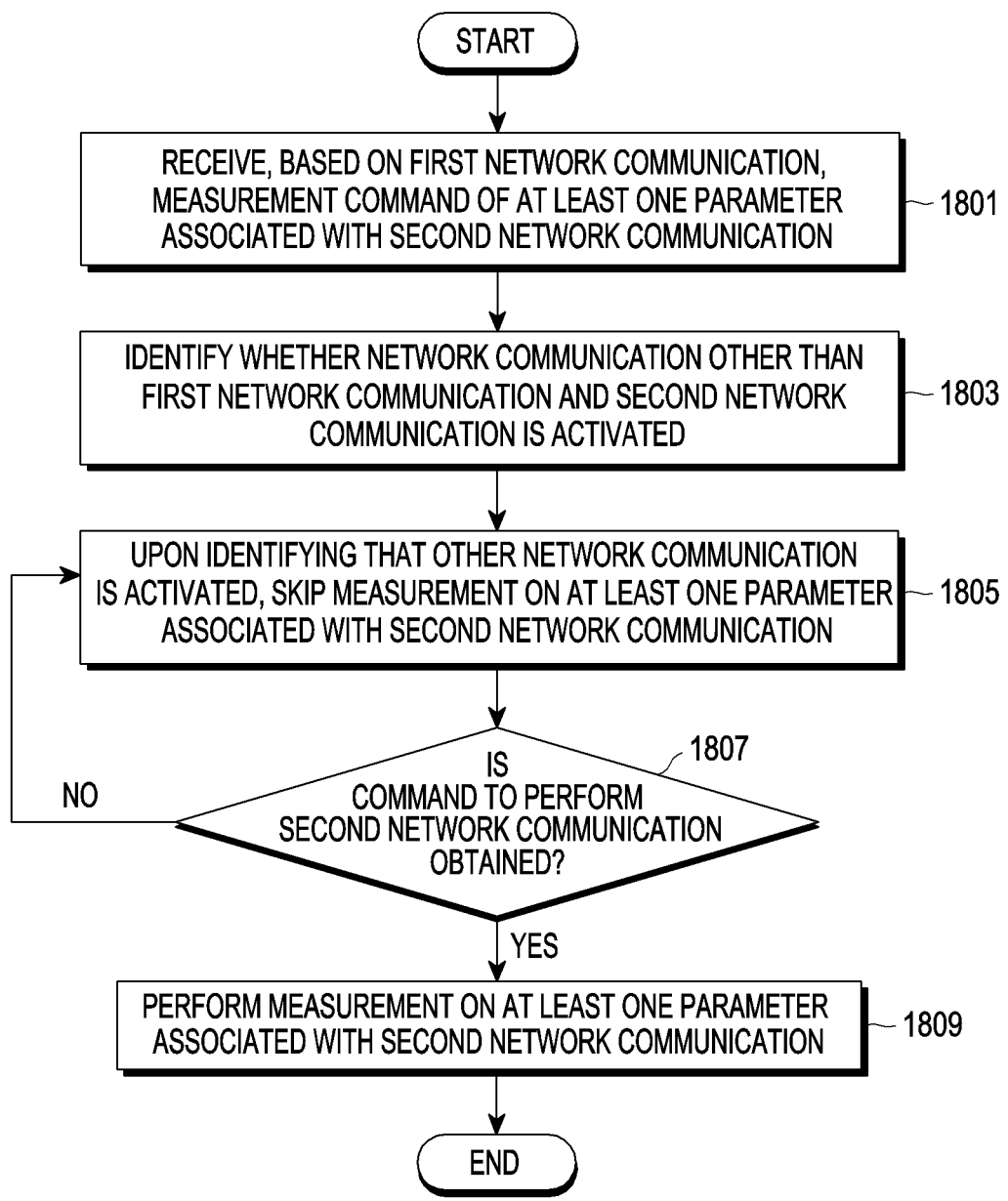
FIG. 18 is a flowchart illustrating example operations of an electronic device according to an embodiment.
Figure 19:
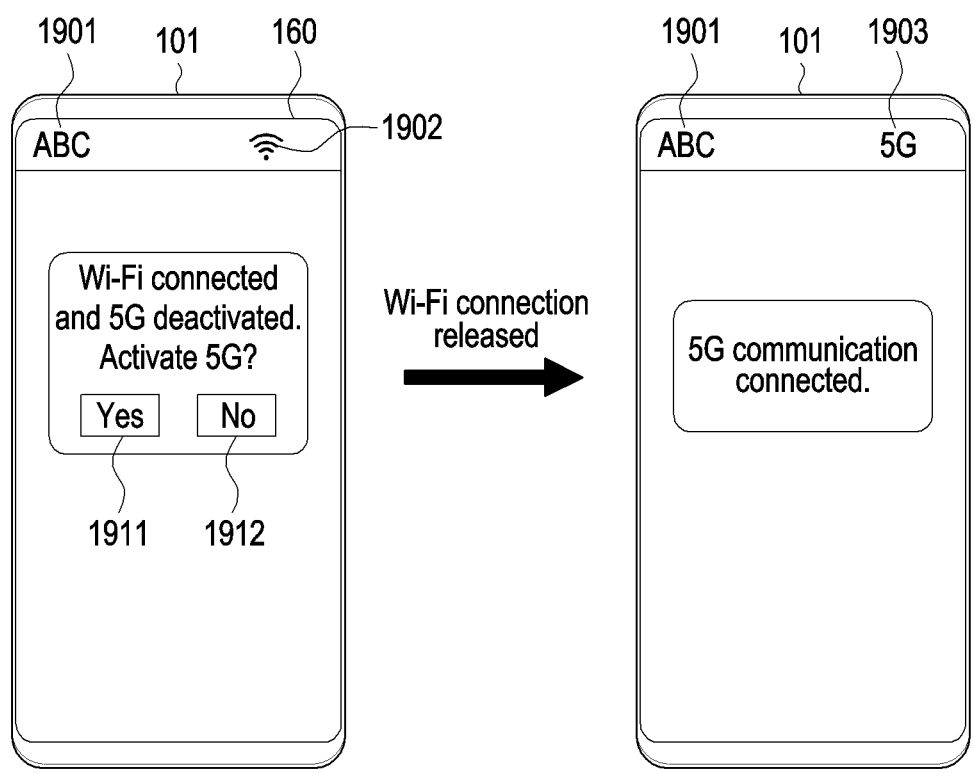
FIG. 19 is a diagram illustrating an example electronic device according to an embodiment.

FIG. 18 is a flowchart illustrating example operations of an electronic device according to an embodiment. Among the operations of FIG. 18, those already described above are briefly described below. The embodiment of FIG. 18 is described with reference to FIG. 19. FIG. 19 is a diagram illustrating an example electronic device according to an embodiment.

According to an embodiment, in operation 1801, an electronic device 101 (e.g., at least one of the processor 120, the first communication processor 212, the second communication processor 214, the integrated communication processor 260, or the integrated SoC 620) may receive a measurement command of at least one parameter associated with second network communication based on first network communication. In operation 1803, the electronic device 101 may identify whether network communication other than the first network communication and the second network communication is activated. For example, the electronic device 101 may identify that Wi-Fi communication is activated. As shown in FIG. 19, the electronic device 101 may display a network operator identifier 1901 and an icon 1902, indicating that Wi-Fi communication is activated, on the display device 160.

According to an embodiment, upon identifying that the other network communication is activated, the electronic device 101 may skip measurement on at least one parameter associated with the second network communication in operation 1805. For example, as shown in FIG. 19, the electronic device 101 may display a message, indicating that the second network communication (e.g., 5G communication) may be deactivated, based on Wi-Fi connection. The electronic device 101 may display icons 1911 and 1912 to receive a selection as to whether to manually activate the second network communication. The electronic device 101 may identify whether a second network communication perform command is obtained in operation 1807. For example, if a selection of the authorize icon 1911 in FIG. 19 is identified, the electronic device 101 may perform measurement on at least one parameter associated with the second network communication in operation 1809. The electronic device 101 may form a connection for the second network communication based on a report of the measured parameter. Thus, if Wi-Fi communication is released, the electronic device 101 may display an icon 1903 indicating that the second network communication (e.g., 5G communication) is immediately connected as shown in FIG. 19. As the second network communication is maintained even when the Wi-Fi communication is maintained, the electronic device 101 may transmit or receive user data via the second network communication as soon as the Wi-Fi communication is released. According to an embodiment, after deactivating the second network communication upon Wi-Fi connection, the electronic device 101 may establish a second network communication connection upon requesting to activate the second network communication and, in this case, Wi-Fi may be released. The electronic device 101 may establish the second network communication connection while maintaining the Wi-Fi connection.

Although not shown in other embodiments, the electronic device 101 may detect activation of Wi-Fi, with the first network communication and the second network communication both activated as an example. The electronic device 101 may display a message inquiring whether the second network communication is deactivated according to Wi-Fi activation and, according to the user's selection, maintain or release the second network communication. For example, if a user command to release the second network communication is input, the electronic device 101 may release the second network communication by transmitting an SCG failure message. For example, if the user command to maintain the second network communication is input, the electronic device 101 may maintain the second network communication, with the Wi-Fi communication activated.

As described above, the electronic device 101 may be configured to provide dual connectivity even when other network communication (e.g., Wi-Fi communication) is activated according to the user's selection.

According to an example embodiment, an electronic device comprises: at least one communication processor (e.g., at least one of the first communication processor 212, the second communication processor 214, the integrated communication processor 260, or the integrated SoC 620) configured to support first network communication and second network communication, wherein the at least one communication processor is configured to receive a measurement command of at least one parameter associated with the second network communication, based on the first network communication, identify whether a network communication other than the first network communication and the second network communication is activated, and based on identifying that the other network communication is activated, skip measurement on the at least one parameter associated with the second network communication.

According to an example embodiment, the at least one communication processor (e.g., at least one of the first communication processor 212, the second communication processor 214, the integrated communication processor 260, or the integrated SoC 620) may be configured to, upon identifying that the other network communication is deactivated, measure the at least one parameter of a communication signal from a neighboring base station corresponding to the second network communication and based on the at least one parameter meeting a reporting condition, report the at least one parameter based on the first network communication.

According to an example embodiment, the at least one communication processor (e.g., at least one of the first communication processor 212, the second communication processor 214, the integrated communication processor 260, or the integrated SoC 620) may be configured to form a connection of the second network communication, based on a reporting of the at least one parameter and transmit and/or receive user data based on at least one of the first network communication or the second network communication, identify activation of the other network communication while transmitting or receiving the user data based on at least one of the first network communication or the second network communication, and transmit a message for releasing the connection of the second network communication based on identifying the activation of the other network communication.

According to an example embodiment, the at least one communication processor (e.g., at least one of the first communication processor 212, the second communication processor 214, the integrated communication processor 260, or the integrated SoC 620) may be configured to, as at least part of receiving the measurement command, transmit a connection request based on the first network communication and receive the measurement command after transmitting the connection request.

According to an example embodiment, the at least one communication processor (e.g., at least one of the first communication processor 212, the second communication processor 214, the integrated communication processor 260, or the integrated SoC 620) may be configured to, as at least part of transmitting the connection request based on the first network communication, transmit the connection request based on at least one of a request from an application executed on the electronic device, a request received via the first network communication, or an event of transmission of the connection request identified by the at least one communication processor (e.g., at least one of the first communication processor 212, the second communication processor 214, the integrated communication processor 260, or the integrated SoC 620).

According to an example embodiment, the at least one communication processor (e.g., at least one of the first communication processor 212, the second communication processor 214, the integrated communication processor 260, or the integrated SoC 620) may be configured to, as at least part of receiving the measurement command, set up a VoLTE call based on the first network communication, based on a request for the VoLTE call and receive a DRB release message including the measurement command based on at least one of the setup of the VoLTE call or a termination of the VoLTE call.

According to an example embodiment, the at least one communication processor (e.g., at least one of the first communication processor 212, the second communication processor 214, the integrated communication processor 260, or the integrated SoC 620) may be configured to, as at least part of receiving the measurement command, receive an RRC connection reconfiguration message including the measurement command, based on the first network communication.

According to an example embodiment, the at least one communication processor (e.g., at least one of the first communication processor 212, the second communication processor 214, the integrated communication processor 260, or the integrated SoC 620) may be configured to, as at least part of skipping measurement on the at least one parameter associated with the second network communication, identify whether a PDN configured to use the second network communication, other than an Internet PDN configured based on the first network communication, is activated and skip measurement on the at least one parameter associated with the second network communication, based on the other network communication being activated and there being no additional PDN activated.

According to an example embodiment, the at least one communication processor (e.g., at least one of the first communication processor 212, the second communication processor 214, the integrated communication processor 260, or the integrated SoC 620) may be configured to, as at least part of identifying that the PDN configured to use the second network communication is activated, identify whether a PDN list activated on the electronic device includes a PDN meeting a preconfigured condition for at least one of a PDN identifier or a QCI.

According to an example embodiment, the at least one communication processor (e.g., at least one of the first communication processor 212, the second communication processor 214, the integrated communication processor 260, or the integrated SoC 620) may be configured to identify deactivation of the additional activated PDN while performing measurement on the at least one parameter associated with the second network communication, based on presence of the additional activated PDN and skip measurement of the at least one parameter associated with the second network communication, based on identifying deactivation of the additional PDN.

According to an example embodiment, the at least one communication processor (e.g., at least one of the first communication processor 212, the second communication processor 214, the integrated communication processor 260, or the integrated SoC 620) may be configured to identify activation of the additional activated PDN while skipping measurement on the at least one parameter associated with the second network communication, based on absence of the additional activated PDN and start measurement of the at least one parameter associated with the second network communication, based on identifying activation of the additional PDN.

According to an example embodiment, the at least one communication processor (e.g., at least one of the first communication processor 212, the second communication processor 214, the integrated communication processor 260, or the integrated SoC 620) may be configured to, as at least part of starting measurement of the at least one parameter associated with the second network communication, based on identifying activation of the additional PDN, start measurement on the at least one parameter based on the measurement command being identified as valid.

According to an example embodiment, a method for operating an electronic device configured to support first network communication and second network communication may comprise: receiving a measurement command of at least one parameter associated with the second network communication, based on the first network communication, identifying whether a network communication other than the first network communication and the second network communication is activated, and based on identifying that the other network communication is activated, skipping measurement on the at least one parameter associated with the second network communication.

According to an example embodiment, the method may further comprise, based on identifying that the other network communication is deactivated, measuring the at least one parameter of a communication signal from a neighboring base station corresponding to the second network communication, and based on the at least one parameter meeting a reporting condition, reporting the at least one parameter based on the first network communication.

According to an example embodiment, the method may further comprise forming a connection of the second network communication, based on a reporting of the at least one parameter and transmit or receive user data based on at least one of the first network communication or the second network communication, identifying activation of the other network communication while transmitting or receiving the user data based on at least one of the first network communication or the second network communication, and transmitting a message for releasing the connection of the second network communication based on identifying the activation of the other network communication.

According to an example embodiment, receiving the measurement command may include setting up a VoLTE call based on the first network communication, based on a request for the VoLTE call and receiving a DRB release message including the measurement command based on at least one of the setup of the VoLTE call or a termination of the VoLTE call.

According to an example embodiment, skipping measurement on the at least one parameter associated with the second network communication may include identifying whether a PDN configured to use the second network communication, other than an Internet PDN configured based on the first network communication, is activated and skipping measurement on the at least one parameter associated with the second network communication, based on the other network communication being activated and there being no additional PDN activated.

According to an example embodiment, identifying whether the PDN configured to use the second network communication is activated may include identifying whether a PDN list activated on the electronic device includes a PDN meeting a preconfigured condition for at least one of a PDN identifier or a QCI.

According to an example embodiment, the method may further comprise identifying deactivation of the additional activated PDN while performing measurement on the at least one parameter associated with the second network communication, based on presence of the additional PDN activated and skipping measurement of the at least one parameter associated with the second network communication, based on identifying deactivation of the additional PDN.

According to an example embodiment, an electronic device may comprise: at least one communication processor (e.g., at least one of the first communication processor 212, the second communication processor 214, the integrated communication processor 260, or the integrated SoC 620) configured to support first network communication and second network communication, wherein the at least one communication processor (e.g., at least one of the first communication processor 212, the second communication processor 214, the integrated communication processor 260, or the integrated SoC 620) is configured to receive a measurement command of at least one parameter associated with the second network communication based on the first network communication, skip measurement on the at least one parameter associated with the second network communication based on a network communication other than the first network communication and the second network communication being activated, and measure the at least one parameter associated with the second network communication, based on the other network communication being deactivated.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic device, comprising:
   first communication circuitry configured to perform first network communication;
   second communication circuitry configured to perform second network communication; and
   at least one communication processor operatively coupled to the first and second communication circuitry and configured to support the first network communication and the second network communication, wherein the at least one communication processor is configured to:
   receive, based on the first network communication, a measurement command of at least one parameter associated with the second network communication;
   identify whether a third network communication other than the first network communication and the second network communication is activated:
   in a case that the third network communication is identified as being activated, skip measurement on the at least one parameter associated with the second network communication; and
   in a case that the third network communication is identified as being deactivated, measure the at least one parameter associated with the second network communication, and cause to report a result of the measured at least one parameter.

2. The electronic device of claim 1, wherein the at least one communication processor is configured to:
   form a connection of the second network communication based on a reporting of the at least one parameter and transmit and/or receive user data based on at least one of the first network communication or the second network communication;
   identify activation of the third network communication while transmitting or receiving the user data based on at least one of the first network communication or the second network communication,
   transmit a message for releasing the connection of the second network communication based on the identifying the activation of the third network communication.

3. The electronic device of claim 1, wherein the at least one communication processor is further configured to:
   transmit a connection request based on the first network communication and wherein the measurement command is received after transmitting the connection request.

4. The electronic device of claim 3, wherein the at least one communication processor is configured to: transmit the connection request based on at least one of a request from an application executed on the electronic device, a request received via the first network communication, or an event of transmission of the connection request identified by the at least one communication processor.

5. The electronic device of claim 1, wherein the at least one communication processor is configured to:
   set up a voice over LTE (VoLTE) call based on the first network communication according to a request for the VoLTE call; and
   receive a data radio bearer (DRB) release message including the measurement command based on at least one of the setup of the VoLTE call or a termination of the VoLTE call.

6. The electronic device of claim 1, wherein the at least one communication processor is configured to receive a Radio Resource Control (RRC) connection reconfiguration message including the measurement command based on the first network communication.

7. An electronic device, comprising:
   first communication circuitry configured to perform first network communication;
   second communication circuitry configured to perform second network communication; and
   at least one communication processor operatively coupled to the first and second communication circuitry and configured to support the first network communication and the second network communication, wherein the at least one communication processor is configured to:
   receive, based on the first network communication, a measurement command of at least one parameter associated with the second network communication;
   identify whether a third network communication other than the first network communication and the second network communication is activated;
   identify whether a Packet Data Network (PDN) configured to use the second network communication, other than an Internet PDN configured based on the first network communication, is activated; and
   skip measurement on the at least one parameter associated with the second network communication based on the third network communication being activated and no additional PDN being activated.

8. The electronic device of claim 7, wherein the at least one communication processor is configured to: identify whether a PDN list activated on the electronic device includes a PDN meeting a preconfigured condition for at least one of a PDN identifier or a Quality-of-Service (QoS) Class Identifier (QCI).

9. The electronic device of claim 7, wherein the at least one communication processor is configured to:
   identify deactivation of the additional activated PDN while performing measurement on the at least one parameter associated with the second network communication, based on presence of the additional PDN activated; and
   skip measurement of the at least one parameter associated with the second network communication based on identifying deactivation of the additional PDN.

10. The electronic device of claim 7, wherein the at least one communication processor is configured to:
    identify activation of the additional activated PDN while skipping measurement on the at least one parameter associated with the second network communication based on absence of the additional PDN activated; and
    start measurement of the at least one parameter associated with the second network communication, based on identifying activation of the additional PDN.

11. The electronic device of claim 7, wherein the at least one communication processor is configured to: based on the identifying activation of the additional PDN, start measurement on the at least one parameter based on the measurement command being identified as valid.

12. A method for operating an electronic device configured to support first network communication and second network communication, the method comprising:

receiving, based on the first network communication, a measurement command of at least one parameter associated with the second network communication;

identifying whether a third network communication other than the first network communication and the second network communication is activated;

in a case that the third network communication identified as activated, skipping measurement on the at least one parameter associated with the second network communication; and in a case that the third network communication is identified as deactivated, measuring the at least one parameter associated with the second network communication and reporting a result of the measured at least one parameter.

13. The method of claim 12, further comprising:

forming a connection of the second network communication based on a reporting of the at least one parameter and transmit and/or receive user data based on at least one of the first network communication or the second network communication;

based on identified activation of the third network communication while transmitting and/or receiving the user data based on at least one of the first network communication or the second network communication, transmitting a message for releasing the connection of the second network communication based on the identified activation of the third network communication.

14. The method of claim 12, wherein receiving the measurement command includes:

setting up a Voice over Long Term Evolution (LTE) (VoLTE) call based on the first network communication, based on a request for the VoLTE call; and receiving a data radio bearer (DRB) release message including the measurement command based on at least one of the setup of the VoLTE call or a termination of the VoLTE call.

15. A method for operating an electronic device configured to support first network communication and second network communication, the method comprising:

receiving, based on the first network communication, a measurement command of at least one parameter associated with the second network communication;

identifying whether a third network communication other than the first network communication and the second network communication is activated;

identifying whether a Packet Data Network (PDN) configured to use the second network communication, other than an Internet PDN configured based on the first network communication, is activated; and skipping measurement on the at least one parameter associated with the second network communication, based on the third network communication being activated and no additional PDN being activated.

16. The method of claim 15, wherein identifying whether the PDN configured to use the second network communication is activated includes: identifying whether a PDN list activated on the electronic device includes a PDN meeting a preconfigured condition for at least one of a PDN identifier or a Quality-of-Service (QoS) Class Identifier (QCI).

17. The method of claim 15, further comprising:

identifying deactivation of the additional activated PDN while performing measurement on the at least one parameter associated with the second network communication, based on presence of the additional PDN activated; and skipping measurement of the at least one parameter associated with the second network communication based on identifying deactivation of the additional PDN.

18. An electronic device, comprising:

first communication circuitry configured to perform first network communication;

second communication circuitry configured to perform second network communication; and at least one communication processor operatively coupled to the first and second communication circuitry and configured to support first network communication and second network communication, wherein the at least one communication processor is configured to:

receive, based on the first network communication, a measurement command of at least one parameter associated with the second network communication;

identify whether a third network communication other than the first network communication and the second network communication is activated;

skip measurement on the at least one parameter associated with the second network communication, based on the third network communication being activated; and measure the at least one parameter associated with the second network communication based on the third network communication being deactivated, and report a result of the measured at least one parameter.

19. The electronic device of claim 7, wherein the at least one communication processor is configured to, based on identifying that the other network communication is deactivated:

measure the at least one parameter of a communication signal from a neighboring base station corresponding to the second network communication; and based on the at least one parameter meeting a reporting condition, report the at least one parameter based on the first network communication.

20. The method of claim 15, further comprising, based on identifying that the other network communication is deactivated:

measuring the at least one parameter of a communication signal from a neighboring base station corresponding to the second network communication; and based on the at least one parameter meeting a reporting condition, reporting the at least one parameter based on the first network communication.

* * * * *